United States Patent
Niwa

(10) Patent No.: US 12,504,180 B2
(45) Date of Patent: Dec. 23, 2025

(54) AIR CONDITIONER

(71) Applicant: FUJITSU GENERAL LIMITED, Kanagawa (JP)

(72) Inventor: Tomoaki Niwa, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 85 days.

(21) Appl. No.: 18/681,643

(22) PCT Filed: Jul. 20, 2022

(86) PCT No.: PCT/JP2022/028204
§ 371 (c)(1),
(2) Date: Feb. 6, 2024

(87) PCT Pub. No.: WO2023/062904
PCT Pub. Date: Apr. 20, 2023

(65) Prior Publication Data
US 2024/0361012 A1    Oct. 31, 2024

(30) Foreign Application Priority Data
Oct. 14, 2021    (JP) .................................. 2021-168942

(51) Int. Cl.
*F24F 1/62*    (2011.01)
*F24F 13/20*    (2006.01)

(52) U.S. Cl.
CPC ................. *F24F 1/62* (2013.01); *F24F 13/20* (2013.01); *F24F 2221/17* (2013.01)

(58) Field of Classification Search
CPC ........... F24F 1/62; F24F 13/20; F24F 2221/17
See application file for complete search history.

(56) References Cited

U.S. PATENT DOCUMENTS

| | | | |
|---|---|---|---|
| RE21,298 E | * 12/1939 | Nelson | F24F 1/027 62/428 |
| 10,352,594 B2 | 7/2019 | D'Souza et al. | |
| 2023/0114621 A1 | 4/2023 | Aoki et al. | |

FOREIGN PATENT DOCUMENTS

| JP | H01-097132 U | 6/1989 |
|---|---|---|
| JP | 2000-291975 A | 10/2000 |

(Continued)

OTHER PUBLICATIONS

WO-2021187440-A1 translation.*

*Primary Examiner* — Elizabeth J Martin
(74) *Attorney, Agent, or Firm* — Paratus Law Group, PLLC

(57) ABSTRACT

There is provided an air conditioner including an indoor unit having an indoor heat exchanger, an outdoor unit having an outdoor heat exchanger connected to the indoor heat exchanger through a refrigerant pipe, and an outside casing housing at least the outdoor unit and is attached to a building wall that partitions an outdoor space and an indoor space. The outside casing is fitted in a wall communication hole formed in the building wall and communicating between the outdoor space and the indoor space, and has an inside space in which the outdoor unit is capable of being disposed A thermal insulation material is disposed in the inside space, and the thermal insulation material at least includes a first thermal insulation portion that is disposed on a side of the outdoor space and a second thermal insulation portion that is disposed on a side of the indoor space.

15 Claims, 17 Drawing Sheets

(56) References Cited

FOREIGN PATENT DOCUMENTS

| JP | 2015-114035 A | 6/2015 | | |
|---|---|---|---|---|
| WO | WO 2016/092669 A1 | 6/2016 | | |
| WO | WO-2021187440 A1 * | 9/2021 | ............ | F24F 13/222 |

* cited by examiner

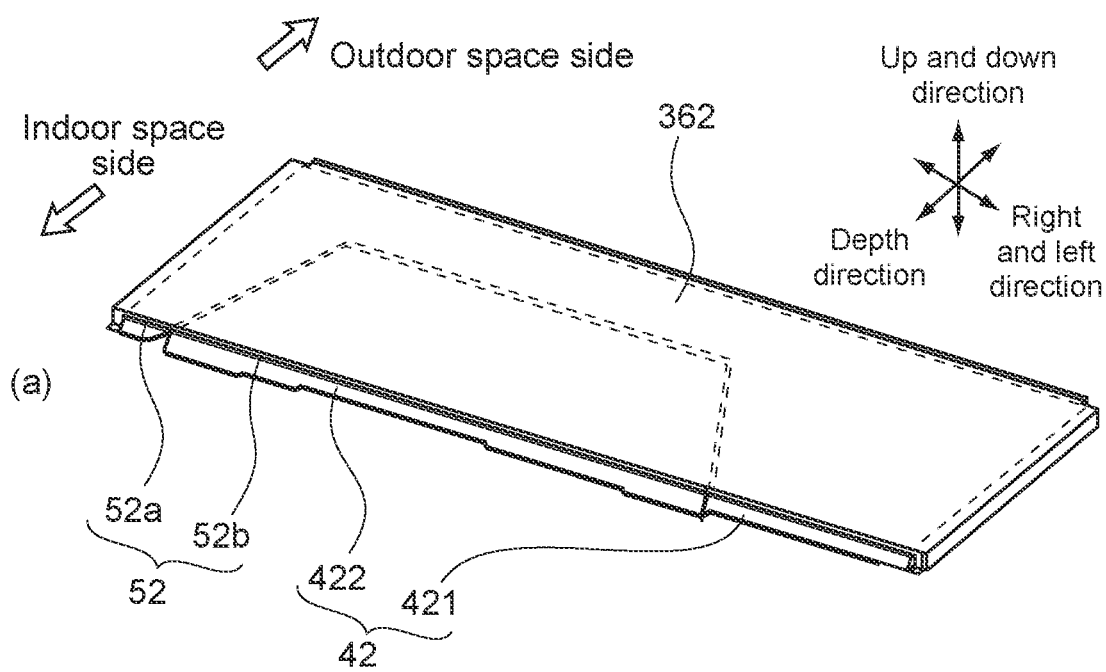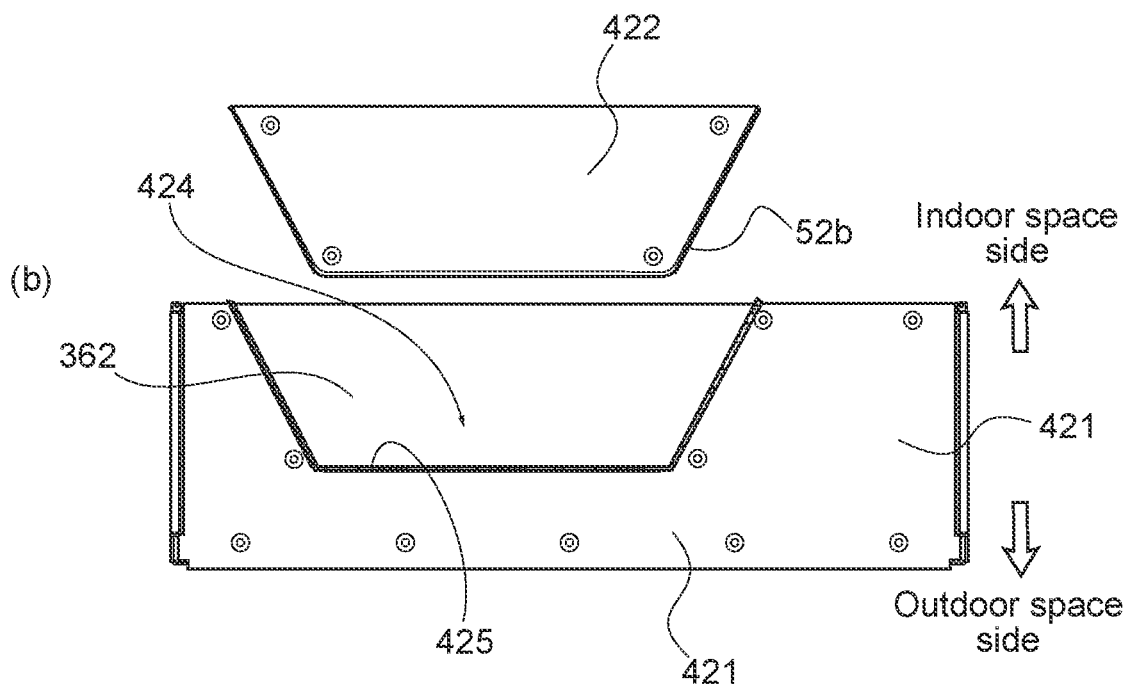
FIG.11

AIR CONDITIONER

CROSS REFERENCE TO PRIOR APPLICATION

This application is a National Stage Patent Application of PCT International Patent Application No. PCT/JP2022/028204 (filed on Jul. 20, 2022) under 35 U.S.C. § 371, which claims priority to Japanese Patent Application No. 2021-168942 (filed on Oct. 14, 2021), which are all hereby incorporated by reference in their entirety.

TECHNICAL FIELD

The present invention relates to an air conditioner that is installed in a wall communication hole formed in a wall that partitions an outdoor space and an indoor space.

BACKGROUND ART

Among air conditioners, there is an air conditioner called packaged terminal air conditioner (PTAC). The air conditioner is installed in a wall communication hole formed in a wall that partitions an outdoor space and an indoor space. When installing the air conditioner in the wall communication hole, the air conditioner is installed inside a casing (hereinafter, referred to as an outside casing) formed to have a size corresponding to a wall communication hole prepared separate from the air conditioner, i.e., the air conditioner is installed in the wall communication hole via the outside casing e.g., see Patent Literature 1).

CITATION LIST

Patent Literature

Patent Literature 1: U.S. Pat. No. 10,352,594

DISCLOSURE OF INVENTION

Technical Problem

In the above-mentioned air conditioner, a part of the outside casing is disposed in a location where it is exposed to the indoor air while the other part is disposed in a location where it is exposed to outdoor air. Thus, in a winter season, the part of the outside casing exposed to the indoor air as well as the part of the outside casing exposed to the outdoor air are cooled by the outdoor air. Therefore, in the part of the outside casing exposed to the indoor air, condensation occurs due to a temperature difference between the indoor air and the outdoor space.

A possible method of preventing the condensation is a method of providing a thermal insulation material on an inner wall of the outside casing. However, the dimensions of the wall communication hole provided in the wall are regulated by the standards. Therefore, if the thermal insulation material is made thicker in order to sufficiently suppress the condensation, the air conditioner comes into contact with the thermal insulation material when the air conditioner is installed in the outside casing, and the workability in installing the air conditioner in the outside casing deteriorates. On the other hand, if the thermal insulation material is made thinner, sufficient thermal insulation properties between the indoor space and the inside of the outside casing cannot be secured, and thus the occurrence of the condensation in the part of the outside casing exposed to the indoor air cannot be suppressed.

In view of the above-mentioned circumstances, it is an objective of the present invention to provide an air conditioner with sufficient thermal insulation performance without affecting the installation property in installing an air conditioner in a casing.

Solution to Problem

In order to accomplish the above-mentioned objective, an air conditioner according to an embodiment of the present invention includes an indoor unit having an indoor heat exchanger, an outdoor unit having an outdoor heat exchanger connected to the indoor heat exchanger through a refrigerant pipe, and an outside casing housing at least the outdoor unit and is attached to a building wall that partitions an outdoor space and an indoor space.

The outside casing is fitted in a wall communication hole and has an inside space in which the outdoor unit is capable of being disposed, the wall communication hole being formed in the building wall, and the wall communication hole communicating between the outdoor space and the indoor space.

The inside space is opened to the outdoor space.

The outdoor unit is disposed in the inside space of the outside casing.

A thermal insulation material is disposed in the inside space of the outside casing.

The thermal insulation material at least includes a first thermal insulation portion that is disposed on a side of the outdoor space and a second thermal insulation portion that is disposed on a side of the indoor space and is attachable and detachable.

Such an air conditioner is excellent in the installation property in installing the air conditioner in the outside casing, and the outside casing has sufficient thermal insulation performance.

In the air conditioner, the thermal insulation material may be disposed on a lower side of a top wall that forms an upper surface of the outside casing.

Such an air conditioner is excellent in the installation property in installing the air conditioner in the outside casing, and the outside casing has more sufficient thermal insulation performance.

In the air conditioner, the first thermal insulation portion may have a recess portion in which the second thermal insulation portion fits, and
  provided that a direction perpendicular to a direction toward the indoor space from the outdoor space and an up and down direction as the top wall is upper is a right and left direction,
  the recess portion may be formed so that a dimension of the recess portion on the side of the indoor space is larger than a dimension of the recess portion on the side of the outdoor space in the right and left direction.

Such an air conditioner is excellent in the installation property in installing the air conditioner in the outside casing, and the outside casing has more sufficient thermal insulation performance.

In the air conditioner, the top wall may have a first top wall that is disposed in the indoor space and a second top wall that is disposed from the wall communication hole to the outdoor space when the outside casing is fitted in the wall communication hole, and the first thermal insulation portion and the second thermal insulation portion may be disposed on a lower side of the second top wall.

Such an air conditioner is excellent in the installation property in installing the air conditioner in the outside casing, and the outside casing has more sufficient thermal insulation performance.

In the air conditioner, a first wind-shielding material may be provided between the first thermal insulation portion and the second thermal insulation portion.

Such an air conditioner is excellent in the installation property in installing the air conditioner in the outside casing, and the outside casing has more sufficient thermal insulation performance.

In the air conditioner, a space forming member forming a space between the outside casing and the thermal insulation material may be disposed between the outside casing and the thermal insulation material.

Such an air conditioner is excellent in the installation property in installing the air conditioner in the outside casing, and the outside casing has more sufficient thermal insulation performance.

In the air conditioner, the first thermal insulation portion may be divided into at least a first thermal insulation member and a second thermal insulation member, the first thermal insulation member may have a first end surface that faces the second thermal insulation member, the second thermal insulation member may have a second end surface that faces the first thermal insulation member, and the first end surface and the second end surface may face each other.

Such an air conditioner is excellent in the installation property in installing the air conditioner in the outside casing, and the outside casing has more sufficient thermal insulation performance.

In the air conditioner, the first thermal insulation member may have a first base portion and a first extension portion extending from the first base portion, the second thermal insulation member may have a second base portion and a second extension portion extending from the second base portion, in an indoor and outdoor direction toward the indoor space from the outdoor space, the length of the first extension portion may be shorter than the first base portion and the length of the second extension portion may be shorter than the second base portion, and the first end surface may be provided in the first extension portion and the second end surface may be provided in the second extension portion.

Such an air conditioner is excellent in the installation property in installing the air conditioner in the outside casing, and the outside casing has more sufficient thermal insulation performance.

In the air conditioner, either one of the first end surface and the second end surface may include a pressing surface that applies a pressure toward the outside casing to the other of the first end surface and the second end surface, and the other may include an action surface that receives a press.

Such an air conditioner is excellent in the installation property in installing the air conditioner in the outside casing, and the outside casing has more sufficient thermal insulation performance.

In the air conditioner, the length of the first extension portion in a direction perpendicular to the indoor and outdoor direction may be longer than the length of the second extension portion in the direction perpendicular to the indoor and outdoor direction, the first end surface may include the pressing surface, and the first extension portion in vicinity of the first end surface may be provided with a fixing portion that fixes the first thermal insulation member to the outside casing.

Such an air conditioner is excellent in the installation property in installing the air conditioner in the outside casing, and the outside casing has more sufficient thermal insulation performance.

In the air conditioner, the pressing surface may be formed to have an acute angle with respect to the outside casing when the first thermal insulation portion is disposed in the outside casing, and the action surface may be formed to have an acute angle with respect to the outside casing when the second thermal insulation portion is disposed in the outside casing.

Such an air conditioner is excellent in the installation property in installing the air conditioner in the outside casing, and the outside casing has more sufficient thermal insulation performance.

In the air conditioner, the pressing surface may be formed to be in parallel with the outside casing when the first thermal insulation portion is disposed in the outside casing, and the action surface may be formed to be in parallel with the pressing surface formed in parallel with the outside casing when the second thermal insulation portion is disposed in the outside casing.

Such an air conditioner is excellent in the installation property in installing the air conditioner in the outside casing, and the outside casing has more sufficient thermal insulation performance.

In the air conditioner, a second wind-shielding material may be disposed between the pressing surface and the action surface when the first thermal insulation portion is disposed in the outside casing.

Such an air conditioner is excellent in the installation property in installing the air conditioner in the outside casing, and the outside casing has more sufficient thermal insulation performance.

In the air conditioner, a cushioning member may be disposed between the first thermal insulation portion and the outside casing, the cushioning member may include a first cushioning member disposed between the first thermal insulation member and the outside casing, and a second cushioning member disposed between the second thermal insulation member and the outside casing, a part of the first cushioning member or a part of the second cushioning member may be provided between the pressing surface and the action surface, and the part of the first cushioning member or the part of the second cushioning member provided between the pressing surface and the action surface may become the second wind-shielding material.

Such an air conditioner is excellent in the installation property in installing the air conditioner in the outside casing, and the outside casing has more sufficient thermal insulation performance.

In the air conditioner, a part of the cushioning member disposed between either one of the first thermal insulation member and the second thermal insulation member, in which the pressing surface is formed, and the outside casing may become the second wind-shielding material.

Such an air conditioner is excellent in the installation property in installing the air conditioner in the outside casing, and the outside casing has more sufficient thermal insulation performance.

Advantageous Effects of Invention

As described above, in accordance with the present invention, an air conditioner with sufficient thermal insulation performance without affecting the installation property in installing an air conditioner in a casing is provided.

BRIEF DESCRIPTION OF DRAWINGS

FIG. 11 Part (a) of the figure is a schematic perspective view showing another example of a second space forming member. Part (b) of the figure is a schematic cross-sectional view showing another example of the second space forming member.

MODE(S) FOR CARRYING OUT THE INVENTION

Hereinafter, an embodiment of the present invention will be described with reference to the drawings. Moreover, the same components or components with the same functions may be denoted by the same reference signs and descriptions of the components may be omitted as appropriate once the components are described. Furthermore, numeric values described below are examples, and the present invention is not limited to those examples.

(Air Conditioner)

Figure 1:
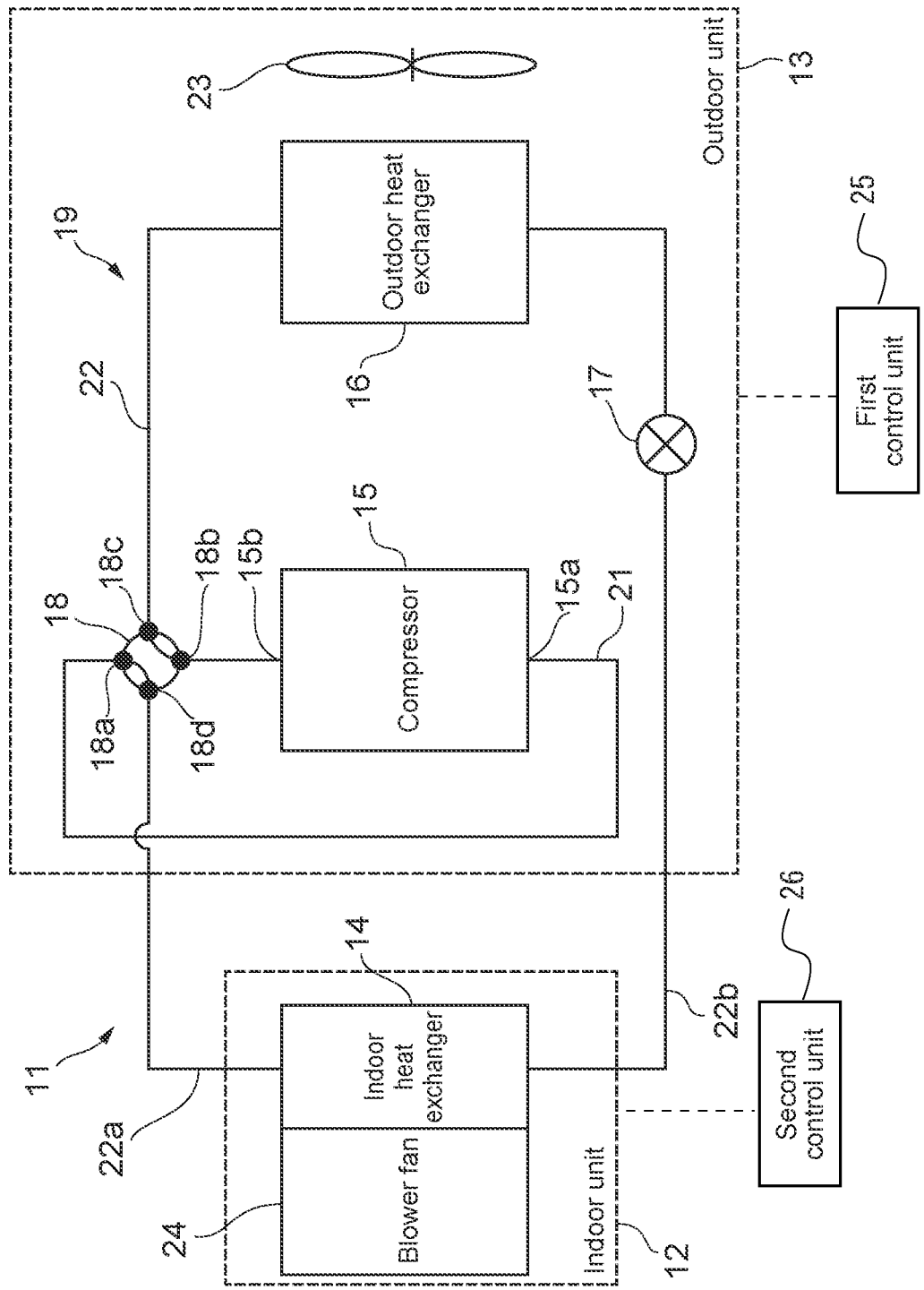
FIG. 1 A schematic block diagram showing an air conditioner according to the present embodiment.

FIG. 1 is a schematic block diagram showing an air conditioner according to the present embodiment.

An air conditioner 11 includes an indoor unit 12 and an outdoor unit 13. The indoor unit 12 is installed in an indoor space in a building, for example. The indoor unit 12 is fixed to a wall surface in the indoor space at a height of 2 meter or more from the floor in the indoor space, for example. The indoor unit 12 may be installed in a space corresponding to the indoor space. The indoor unit 12 has an indoor heat exchanger 14. The outdoor unit 13 has a compressor 15, an outdoor heat exchanger 16, an expansion valve 17, and a four-way valve 18. The indoor heat exchanger 14, the compressor 15, the outdoor heat exchanger 16, the expansion valve 17, and the four-way valve 18 form a refrigeration circuit (refrigerant circuit) 19. The outdoor heat exchanger 16 is connected to the indoor heat exchanger 14 through a refrigerant pipe. The outdoor unit 13 is controlled by a first control unit 25 and the indoor unit 12 is controlled by a second control unit 26. The first control unit 25 and the second control unit 26 transmit/receive signals to/from each other.

The refrigeration circuit 19 includes a first circulation path 21. The first circulation path 21 connects a first port 18a to a second port 18b of the four-way valve 18. The compressor 15 is disposed in the first circulation path 21. A suction pipe 15a of the compressor 15 is connected to the first port 18a of the four-way valve 18 via the refrigerant pipe. A gas refrigerant is supplied from the first port 18a to the suction pipe 15a of the compressor 15. The compressor 15 compresses the low-pressure gas refrigerant to a predetermined pressure. A discharge pipe 15b of the compressor 15 is connected to the second port 18b of the four-way valve 18 via a refrigerant pipe. A gas refrigerant is supplied from the discharge pipe 15b of the compressor 15 to the second port 18b of the four-way valve 18. The refrigerant pipe may be, for example, a copper pipe.

The refrigeration circuit 19 further includes a second circulation path 22. The second circulation path 22 connects a third port 18c to a fourth port 18d of the four-way valve 18. The outdoor heat exchanger 16, the expansion valve 17, and the indoor heat exchanger 14 are incorporated in the second circulation path 22 in order from the third port 18c side. The outdoor heat exchanger 16 exchanges heat energy between the refrigerant passing through the outdoor heat exchanger 16 and the air in contact with the outdoor heat exchanger 16. The indoor heat exchanger 14 exchanges heat energy between the refrigerant passing through the indoor heat exchanger 14 and the air in contact with the indoor heat exchanger 14. The second circulation path 22 includes a gas pipe 22a that is connected to the fourth port 18d of the four-way valve 18, is drawn from the outdoor unit 13, and extends toward the indoor heat exchanger 14, and a liquid pipe 22b that is connected to the expansion valve 17, is drawn from the outdoor unit 13, and extends toward the indoor heat exchanger 14.

A blower fan 23 is incorporated in the outdoor unit 13. The blower fan 23 sends outdoor air to the outdoor heat exchanger 16. The blower fan 23 generates an air flow in accordance with rotation of an impeller, for example. The air flow passes through the outdoor heat exchanger 16 by the action of the blower fan 23. The outdoor air passes through the outdoor heat exchanger 16 and exchanges heat with a refrigerant. The heat-exchanged cold or warm air flow is blown out from the outdoor unit 13. The flow rate of the air flow passing through is adjusted in accordance with the rotation speed of the blower fan 23.

A blower fan 24 is incorporated in the indoor unit 12. The blower fan 24 sends indoor air to the indoor heat exchanger 14. The blower fan 24 generates an air flow in accordance with rotation of an impeller. The indoor air is sucked into the indoor unit 12 by the action of the blower fan 24. The indoor air passes through the indoor heat exchanger 14 and exchanges heat with a refrigerant. The heat-exchanged cold or warm air flow is blown out from the indoor unit 12. The flow rate of the air flow passing through is adjusted in accordance with the rotation speed of the blower fan 24.

In the case where a cooling operation is performed in the refrigeration circuit 19, the four-way valve 18 connects the second port 18b and the third port 18c to each other and connects the first port 18a and the fourth port 18d to each other. Therefore, a high-temperature and high-pressure refrigerant is supplied from the discharge pipe 15b of the compressor 15 to the outdoor heat exchanger 16. The refrigerant flows through the outdoor heat exchanger 16, the expansion valve 17, and the indoor heat exchanger 14 in order. Heat is dissipated from the refrigerant to the outdoor air in the outdoor heat exchanger 16. The expansion valve 17 reduces the pressure of the refrigerant to a low pressure. The pressure-reduced refrigerant absorbs heat from the indoor air in the indoor heat exchanger 14. As a result, the indoor unit 12 generates cool air. The cool air is blown out into the indoor space by the action of the blower fan 24.

In the case where a heating operation is performed in the refrigeration circuit 19, the four-way valve 18 connects the second port 18b and the fourth port 18d to each other and connects the first port 18a and the third port 18c to each other. A high-temperature and high-pressure refrigerant is supplied from the compressor 15 to the indoor heat exchanger 14. The refrigerant flows through the indoor heat exchanger 14, the expansion valve 17, and the outdoor heat exchanger 16 in order. Heat is dissipated from the refrigerant to the surrounding air in the indoor heat exchanger 14. As a result, the indoor unit 12 generates warm air. The warm air is blown out into the indoor space by the action of the blower fan 24. The expansion valve 17 reduces the pressure of the refrigerant to a low pressure. The pressure-reduced refrigerant absorbs heat from the outdoor air in the outdoor heat exchanger 16. After that, the refrigerant returns to the compressor 15.

When the heating operation is performed for a long time and the temperature of the outdoor heat exchanger 16 reaches below the freezing point, for example, frost adheres to the outdoor heat exchanger 16 in some cases. Therefore, in the heating operation, a defrosting operation for removing frost from the outdoor heat exchanger 16 is periodically performed. In the case where the defrosting operation is performed in the refrigeration circuit 19, the four-way valve 18 connects the second port 18b to the third port 18c and connects the first port 18a to the fourth port 18d, similarly to the cooling operation. A high-temperature and high-pressure refrigerant is supplied from the discharge pipe 15b of the compressor 15 to the outdoor heat exchanger 16. The refrigerant flows through the outdoor heat exchanger 16, the expansion valve 17, and the indoor heat exchanger 14 in order. Heat is dissipated from the refrigerant to the outdoor air in the outdoor heat exchanger 16. The blower fan 23 and the blower fan 24 are stopped on the defrosting operation. As a result, frost adhered to the outdoor heat exchanger 16 melts, and this frost is defrosted from the outdoor heat exchanger 16. Further, since the defrosting operation is periodically performed during the heating operation, the heating operation may include the defrosting operation, and the defrosting operation and the heating operation may be collectively referred to as the heating operation.

Figure 2:
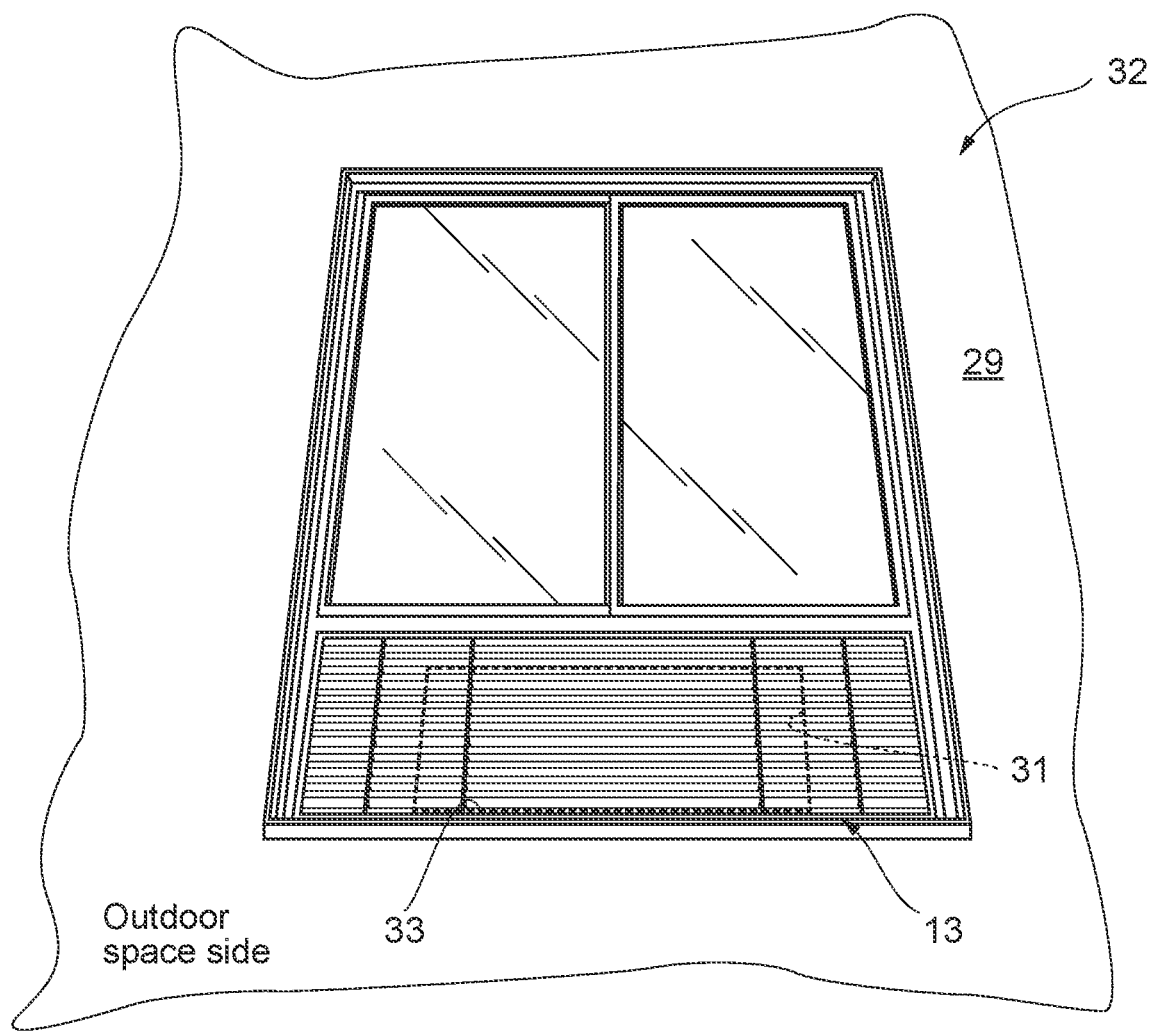
FIG. 2 A conceptual diagram schematically showing an outdoor unit observed in an outdoor space.
Figure 3:
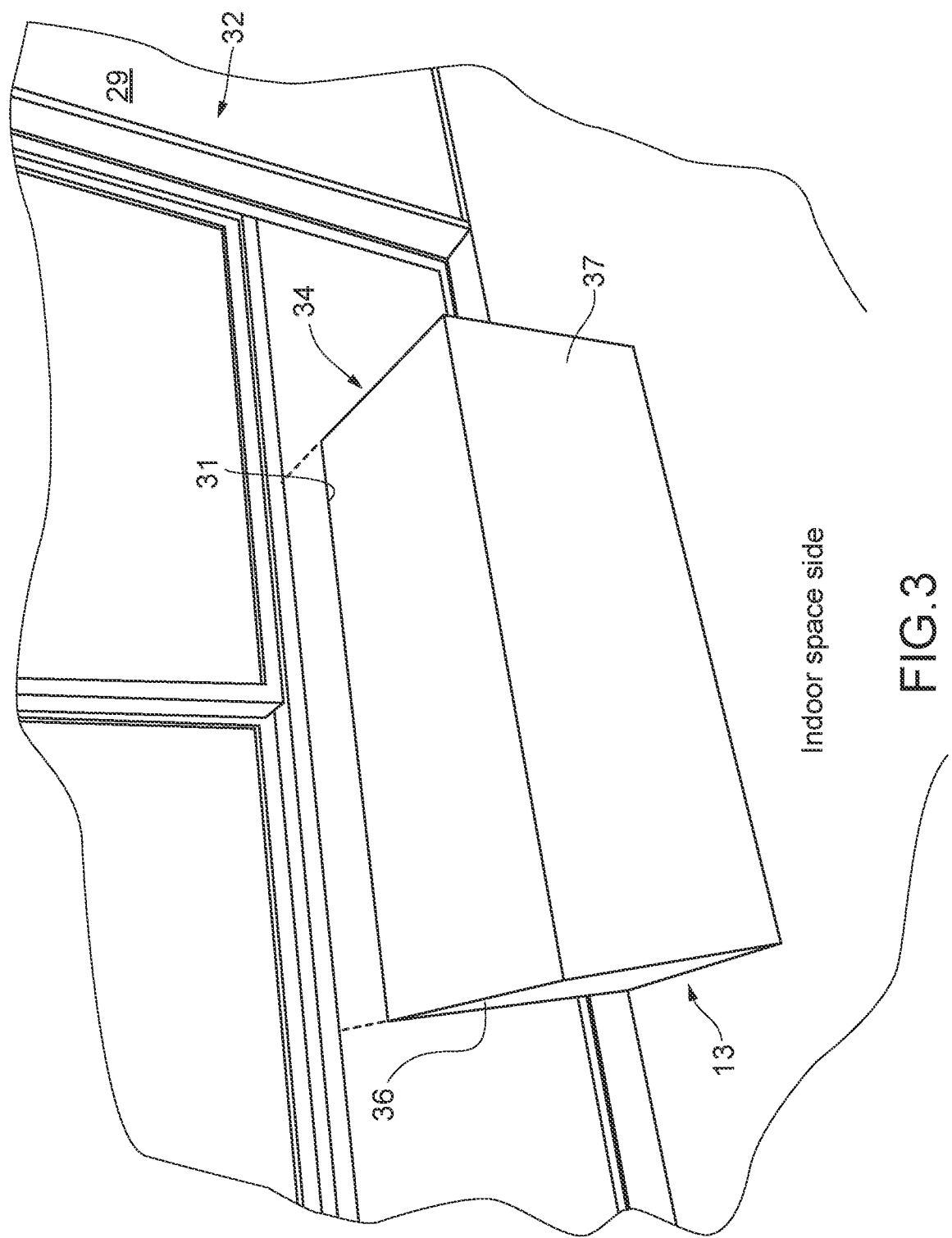
FIG. 3 A conceptual diagram schematically showing the outdoor unit observed in an indoor space.

FIG. 2 is a conceptual diagram schematically showing an outdoor unit observed in an outdoor space. FIG. 3 is a conceptual diagram schematically showing the outdoor unit observed in an indoor space.

The air conditioner 11 (FIG. 1) is attached to a building wall 29 that partitions the outdoor space and the indoor space. The air conditioner 11 includes an outside casing 34 for housing at least the outdoor unit 13. The outside casing 34 is fitted in a wall communication hole 31 formed in the building wall 29. The wall communication hole 31 is opened to the outdoor space (space outside the building) in an outer wall surface of a building 32. The wall communication hole 31 passes through the building wall 29 so as to put the outdoor space and the indoor space in communication with each other. The wall communication hole 31 is designed with dimensions regulated by the standards of PTAC. The outdoor unit 13 is installed in the outside casing 34 and an open port 33 is opened to the outdoor space. The indoor unit 12 may be installed in the outside casing 34 together with the outdoor unit 13. In this specification, an embodiment in which the outdoor unit 13 is installed in the outside casing 34 will be described.

(Outside Casing)

Figure 4:
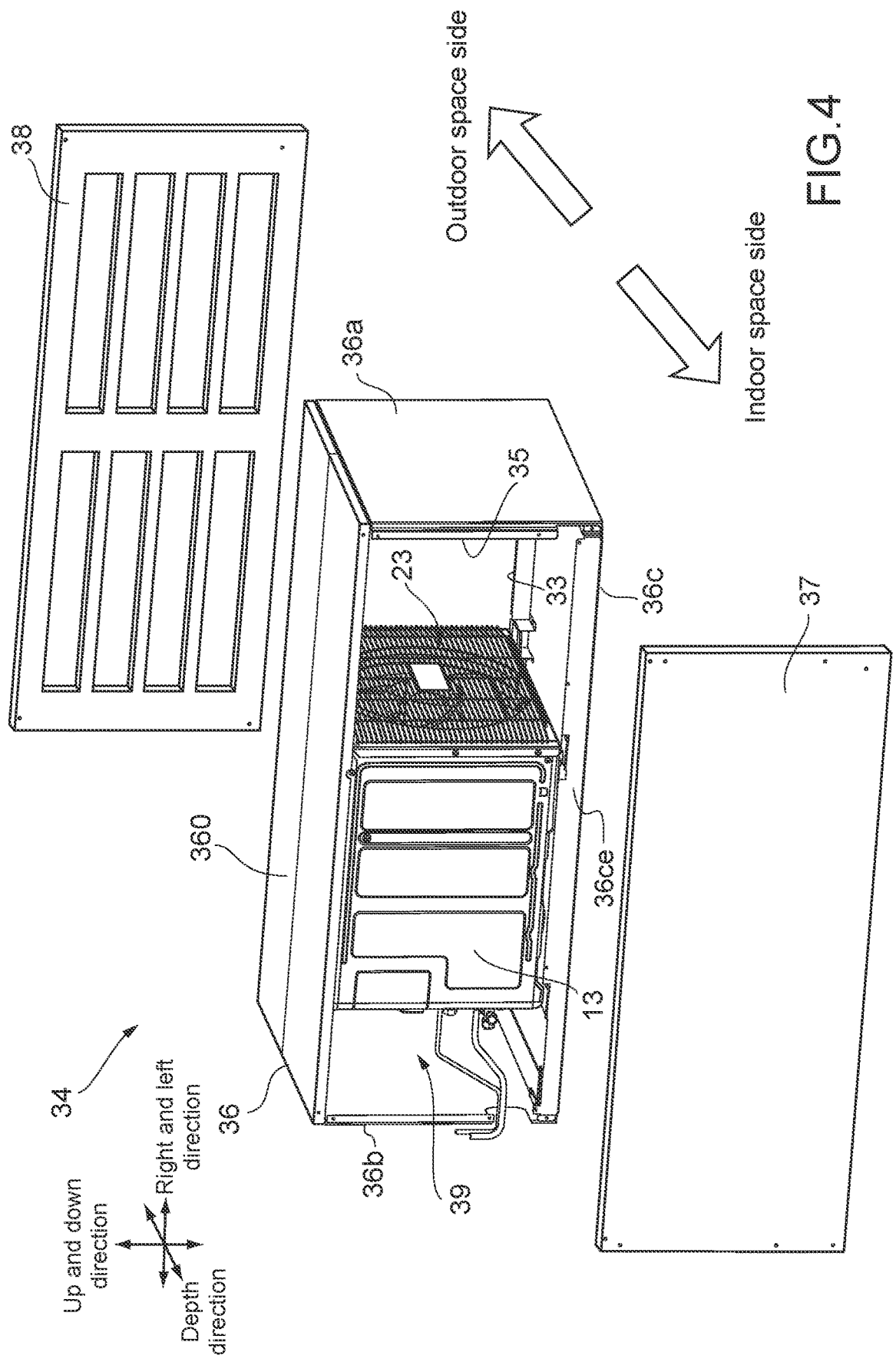
FIG. 4 An exploded perspective view conceptually showing an outside casing detached from a building wall and the outdoor unit installed in the outside casing.

FIG. 4 is an exploded perspective view conceptually showing an outside casing detached from a building wall and the outdoor unit installed in the outside casing.

The outside casing 34 defines an inside space 39 from the indoor space. The outside casing 34 isolates inside space 39 from the indoor space. The outside casing 34 includes a wall body 36, a front panel 37, and a grille 38. The outside casing 34 is, for example, formed of a sheet metal.

The wall body 36 has a storage port 35 opened toward the indoor space. The wall body 36 includes a first side wall (right side wall) 36a, a second side wall (left side wall) 36b, a bottom plate 36c, and a top wall 360. The first side wall 36a is disposed on a right end side of the wall communication hole 31 as viewed from the indoor space side. For example, the first side wall 36a is disposed substantially orthogonal to a wall surface of the building wall 29 (FIG. 2) on the right end side of the wall communication hole 31. The second side wall 36b is disposed on a left end side of the wall communication hole 31 as viewed from the indoor space side. For example, the second side wall 36b is disposed substantially orthogonal to the wall surface of the building wall 29 on the left end side of the wall communication hole 31. The bottom plate 36c is disposed orthogonal to the first side wall 36a and the second side wall 36b. The bottom plate 36c is coupled to a lower end of each of the first side wall 36a and the second side wall 36b. An outer peripheral end of the bottom plate 36c is bent upward for the sake of securing mechanical strength of the bottom plate 36c. Moreover, when rain enters the inside space 39 from the outdoor space or frost adhered to the outdoor heat exchanger 16 melts, such water can remain on the bottom plate 36c because the outer peripheral end of the bottom plate 36c is bent upward. This bent portion will be referred to as a bent portion 36ce. The top wall 360 is coupled to an upper end of each of the first side wall 36a and the second side wall 36b. The top wall 360 closes the inside space 39 of the outside casing 34 from above, which is sandwiched between the first side wall 36a and the second side wall 36b. The front panel 37 is coupled to the wall body 36. The front panel 37 closes the storage port 35. The grille 38 is installed in the open port 33 on a side opposite to the front panel 37.

When the outside casing 34 is assembled with the first side wall 36a, the second side wall 36b, the top wall 360, the bottom plate 36c, the front panel 37, and the grille 38, the first side wall 36a and the second side wall 36b forms side surfaces of the outside casing 34, the bottom plate 36c forms a lower surface of the outside casing 34, the top wall 360 forms an upper surface of the outside casing 34, the front panel 37 forms a front surface of the outside casing 34, and the grille 38 forms a rear surface of the outside casing 34.

Moreover, the outside casing 34 at least has the inside space 39 in which the outdoor unit 13 can be disposed. The inside space 39 is a space surrounded by the first side wall 36a, the second side wall 36b, the top wall 360, the bottom plate 36c, the front panel 37, and the grille 38. The inside space 39 is sandwiched between the first side wall 36a and the second side wall 36b in a direction (hereinafter, a right and left direction) in which the first side wall 36a and the second side wall 36b are opposite to each other. Moreover, the inside space 39 is sandwiched between the top wall 360 and the bottom plate 36c in a direction (hereinafter, an up and down direction) in which the top wall 360 and the bottom plate 36c are opposite to each other. Moreover, the inside space 39 is sandwiched between the front panel 37 and the grille 38 in a direction (hereinafter, also referred to as a depth direction or an indoor and outdoor direction) in which the front panel 37 and the grille 38 are opposite to each other. It should be noted that the right and left direction corresponds to a horizontal direction parallel to an indoor floor along the building wall 29 and the up and down direction corresponds to a perpendicular direction perpendicular to the indoor floor. The depth direction corresponds to a direction orthogonal to the right and left direction and the up and down direction. The inside space 39 is defined by the outside casing 34 from the indoor space and opened to the outdoor space. It should be noted that the grille 38 may be embedded in an outer wall of the building 32 and in that case, the grille 38 may be omitted from the outside casing 34.

Figure 5:
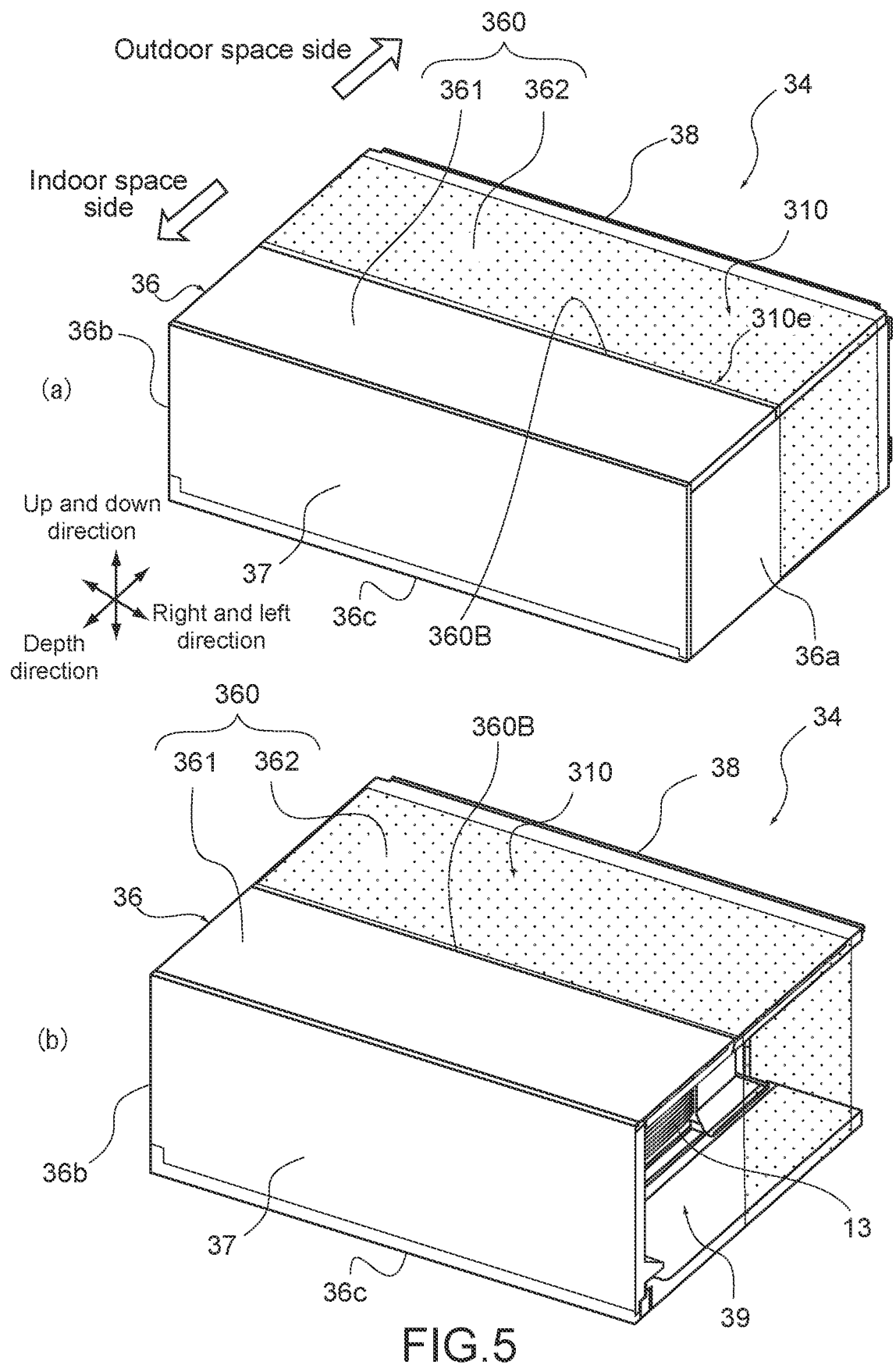
FIG. 5 Part (a) of the figure is a schematic perspective view showing a state in which the outside casing is fitted in a wall communication hole formed in a building wall. Part (b) of the figure is a schematic perspective view showing an inside part of the outside casing after a first side wall and a grille are detached from the state of Part (a) of FIG. 5.

Part (a) of FIG. 5 is a schematic perspective view showing a state in which the outside casing 34 is fitted in the wall communication hole 31 formed in the building wall 29. Moreover, Part (b) of FIG. 5 is a schematic perspective view showing an inside part of the outside casing 34 after the first side wall 36a and the grille 38 are detached from the state of Part (a) of FIG. 5. Although the building wall 29 and the wall communication hole 31 shown in FIG. 3 are not shown in Part (a) and Part (b) of FIG. 5, a region 310 shown as dots corresponds to a region of the outside casing 34 fitted in the wall communication hole 31. In the region 310, the outside casing 34 faces an inner wall of the wall communication hole 31.

When the outside casing 34 is fitted in the wall communication hole 31, the top wall 360 of the outside casing 34 includes a first top wall 361 disposed in the indoor space and a second top wall 362 is disposed in the outdoor space from the wall communication hole 31 (the region 310). The first top wall 361 extends in the right and left direction. The second top wall 362 extends in the right and left direction. Each of the first top wall 361 and the second top wall 362 has the right and left direction as its longitudinal direction. The first top wall 361 and the second top wall 362 are arranged side by side in the depth direction. The first top wall 361 and the second top wall 362 are not in contact with each other.

The first top wall 361 is configured to be attachable and detachable in the outside casing 34. The position of a boundary 360B between the first top wall 361 and the second top wall 362 is aligned with, for example, an opening 310e of the wall communication hole 31 on the indoor space side. The position of the boundary 360B is not limited to the position coinciding with the opening 310e, and may be slightly shifted from the position of the opening 310e to the indoor space side or the outdoor space side.

Figure 6:
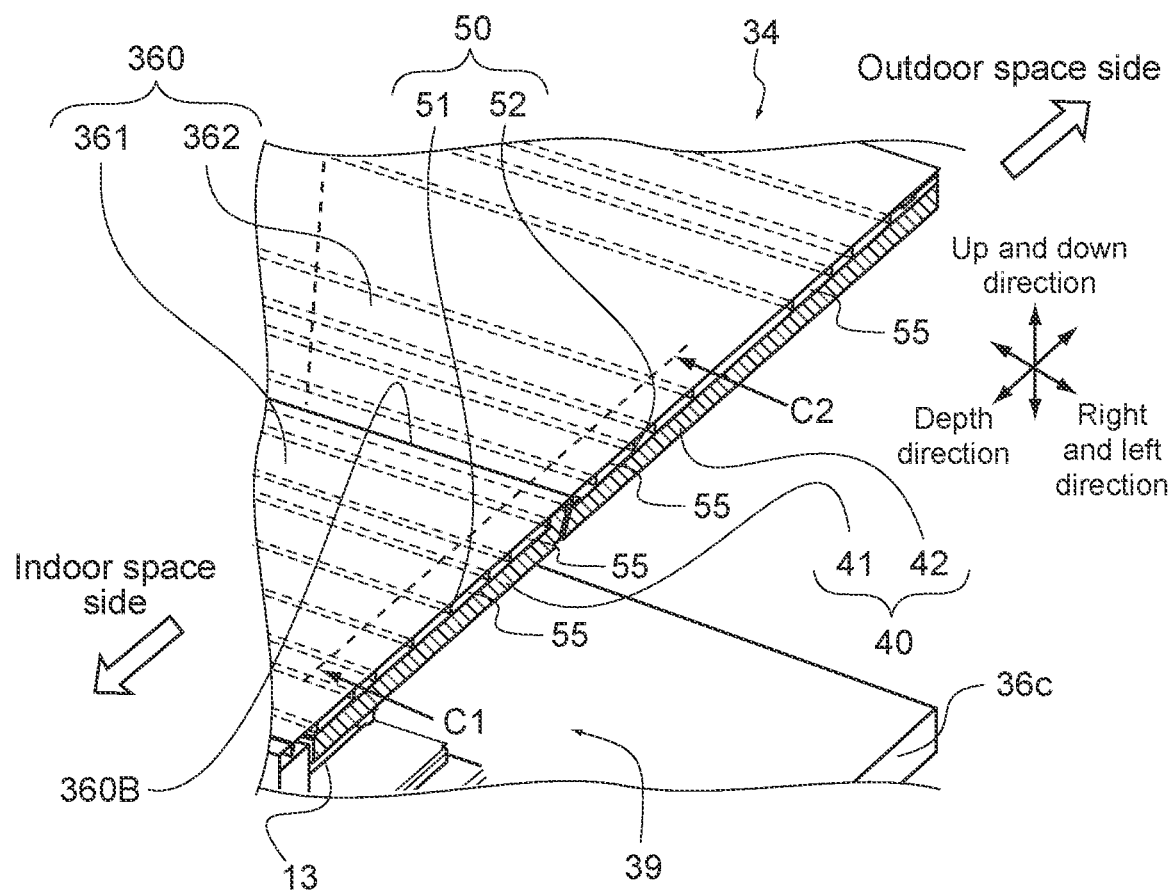
FIG. 6 A schematic perspective view showing the periphery of a right end portion of a top wall after the first side wall is removed from the outside casing.

FIG. 6 is a schematic perspective view showing the periphery of a right end portion of a top wall after the first side wall is removed from the outside casing.

The outside casing 34 includes a thermal insulation material 40 in addition to the wall body 36, the front panel 37, and the grille 38 described above. The thermal insulation material 40 is disposed in the inside space 39 of the outside casing 34. For example, the thermal insulation material 40 is disposed along the top wall 360 under the top wall 360. The thermal insulation material 40 is formed of a foamed polystyrene material, for example.

The thermal insulation material 40 includes a first thermal insulation material 41 that is disposed under the first top wall 361 and a second thermal insulation material 42 that is disposed under the second top wall 362. The first thermal insulation material 41 extends in the right and left direction and has the right and left direction as its longitudinal direction. The second thermal insulation material 42 extends in the right and left direction and has the right and left direction as its longitudinal direction. The first thermal insulation material 41 and the second thermal insulation material 42 are arranged side by side in the depth direction.

Moreover, in the outside casing 34, a space forming member 50 is disposed between the outside casing 34 and the thermal insulation material 40. The space forming member 50 is, for example, formed of a sheet metal. For example, the space forming member 50 is disposed between the top wall 360 of the outside casing 34 and the thermal insulation material 40 disposed under the top wall 360. By the space forming member 50 being disposed between the outside casing 34 and the thermal insulation material 40, a plurality of spaces 55 is formed between the outside casing 34 and the thermal insulation material 40. The plurality of spaces 55 is formed in such a manner that a gap between the outside casing 34 and the thermal insulation material 40 in the depth direction is separated by separation walls 513 included in the space forming member 50. The spaces 55 and the separation walls 513 extend in the right and left direction. It should be noted that the inside space 39 functions as a housing space for housing the air conditioner inside the outside casing 34 while the spaces 55 function as thermal insulation spaces for suppressing heat conduction to the top wall 360 from the inside space 39.

The space forming member 50 includes a first space forming member 51 that is disposed under the first top wall 361 and a second space forming member 52 that is disposed under the second top wall 362. The first space forming member 51 is disposed between the first top wall 361 and the first thermal insulation material 41. The second space forming member 52 is disposed between the second top wall 362 and the second thermal insulation material 42. The first space forming member 51 and the second space forming member 52 extend in the right and left direction and each have the right and left direction as its longitudinal direction. Moreover, the first space forming member 51 and the second space forming member 52 are arranged side by side in the depth direction. The space forming member 50 is fixed to the top wall 360 by a technique such as soldering or fastening with fixation members such as screws. Moreover, the thermal insulation material 40 is fixed to the space forming member 50 or the top wall 360 with fixation jigs (not shown) such as screws. In the up and down direction, the space forming member 50 is supported by the top wall 360 and the thermal insulation material 40 is supported by the space forming member 50 or the top wall 360.

Figure 7:
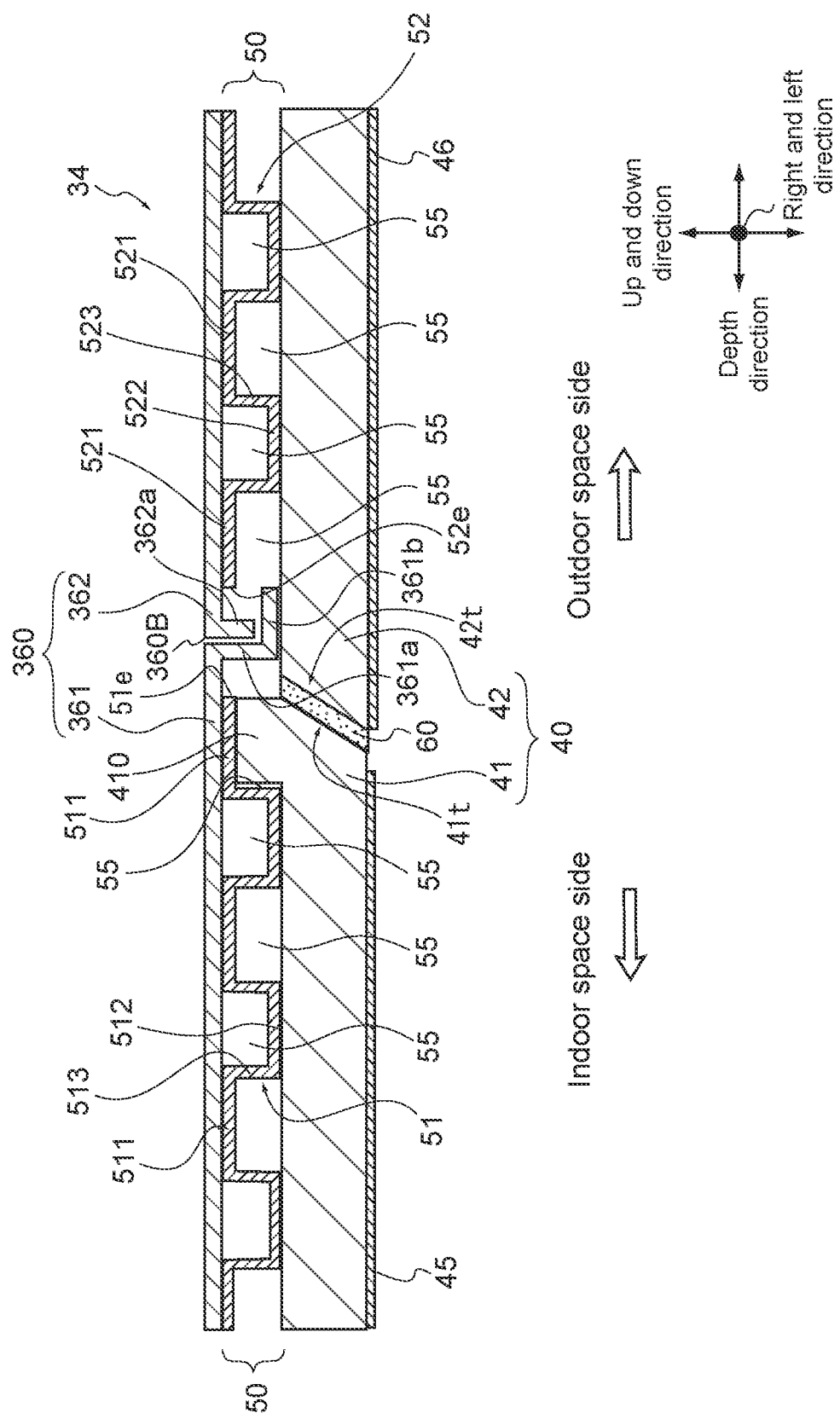
FIG. 7 A schematic cross-sectional view showing a cross-section taken along the line C1-C2 of FIG. 6.

FIG. 7 is a schematic cross-sectional view showing a cross-section taken along the line C1-C2 of FIG. 6. FIG. 7 shows a cross-section as the outside casing 34 is cut in a virtual plane formed by the up and down direction and the depth direction.

An end surface of the first thermal insulation material 41 and an end surface of the second thermal insulation material 42 face each other and each of the end surfaces is a tilt surface. A tilt surface 42t of the second thermal insulation material 42 is formed to tilt upwards toward the second thermal insulation material 42 from the first thermal insulation material 41. A tilt surface 41t of the first thermal insulation material 41 is formed in a shape facing the tilt surface 42t. An elastic body 60 is disposed between the tilt surface 41t and the tilt surface 42t. The elastic body 60 is held in contact with each of the first thermal insulation material 41 and the second thermal insulation material 42. For example, the elastic body 60 is adhered to the second thermal insulation material 42. The first thermal insulation material 41 is merely held in contact with the elastic body 60 and not adhered thereto. The elastic body 60 extends in the right and left direction along the tilt surface 41t and the tilt surface 42t. With the configuration in which the elastic body 60 is sandwiched between the first thermal insulation material 41 and the second thermal insulation material 42 and extends in the right and left direction along the tilt surface 41t and the tilt surface 42t, flowing of the outdoor air into the spaces 55 through a gap between the first thermal insulation material 41 and the second thermal insulation material 42 is suppressed, and thermal insulation properties between the indoor space and the inside space 39 of the outside casing 34 are secured.

It should be noted that the first top wall 361 includes a bent portion 361a that is formed bent downward in vicinity of the boundary 360B and an extension portion 361b that is formed by bending an end portion of the bent portion 361a to the outdoor space side. The second top wall 362 has a bent portion 362a that is formed bent downward in vicinity of the boundary 360B. The bent portion 361a of the first top wall 361 and the bent portion 362a of the second top wall 362 face each other in the depth direction, but they do not come into contact with each other. The extension portion 361b of the first top wall 361 passes under the bent portion 362a of the second top wall 362 and extends to the outdoor space side.

The first space forming member 51 includes a plurality of the plate portions 511, a plurality of plate portions 512, and the plurality of separation walls 513. The first space forming member 51 is a single sheet metal. This sheet metal is repeatedly bent between the plate portion 511 and the separation wall 513 and between the separation wall 513 and the plate portion 512 in the depth direction. The plate portions 511 are held in contact with the first top wall 361. The plate portions 511 are fixed to the first top wall 361 by a technique such as soldering. The plate portions 512 are held in contact with the first thermal insulation material 41. The separation walls 513 are connected to the plate portions 511 and the plate portions 512. The plurality of the plate portions 511 is arranged side by side in the depth direction. The plurality of plate portions 512 is arranged side by side in the depth direction. As the first space forming member 51 is viewed from the first top wall 361 in a see-through manner, the plate portions 511 are disposed between the plate portions 512 adjacent to each other and the plate portions 512 are disposed between the plate portions 511 adjacent to each other. The separation walls 513 extend between the plate portions 511 and the plate portions 512 in the up and down direction. By repeatedly disposing those components in the depth direction in the order of the plate portion 511, the separation wall 513, the plate portion 512, and the separation wall 513, the cross-sectional shape of the first space forming member 51 becomes a rectangular wave shape.

In the first space forming member 51, the separation walls 513 adjacent to each other in the depth direction, the plate portions 511 disposed between the separation walls 513 adjacent to each other, and the first thermal insulation material 41 form a plurality of spaces 55. Moreover, the separation walls 513 adjacent to each other in the depth direction, the plate portions 512 disposed between the separation walls 513 adjacent to each other, and the first top wall 361 form a plurality of spaces 55. Furthermore, in an end portion 51e of the first space forming member 51 in which the first space forming member 51 faces the second space forming member 52, the plate portion 511 that forms the end portion 51e, the separation wall 513 connected to the plate portion 511 that forms the end portion 51e, the bent portion 361a of the first top wall 361, and the first thermal insulation material 41 form a space 55. It should be noted that in the example of FIG. 7, a part of the first thermal insulation material 41 (a partition member 410 to be described later) extends in the space 55 formed in the end portion 51e.

Moreover, the second space forming member 52 includes a plurality of plate portions 521, a plurality of plate portions 522, and a plurality of separation walls 523. The second space forming member 52 is a single sheet metal. This sheet metal is repeatedly bent between the plate portions 521 and the separation walls 523 and between the separation walls 523 and the plate portions 522 in the depth direction. The plate portions 521 are held in contact with the second top wall 362. The plate portions 521 are fixed to the second top wall 362 by a technique such as soldering or screwing. The plate portions 522 are held in contact with the second thermal insulation material 42. The separation walls 523 are connected to the plate portions 521 and the plate portions 522. The plurality of plate portions 521 is arranged side by side in the depth direction. The plurality of plate portions 522 is arranged side by side in the depth direction. As the second space forming member 52 is viewed from the second top wall 362 in a see-through manner, the plate portions 521 are disposed between the plate portions 522 adjacent to each other and the plate portions 522 are disposed between the plate portions 521 adjacent to each other. The separation walls 523 extend between the plate portions 521 and the plate portions 522 in the up and down direction. By repeatedly disposing those components in the depth direction in the order of the plate portion 521, the separation wall 523, the plate portion 522, and the separation wall 523, the cross-sectional shape of the second space forming member 52 becomes a rectangular wave shape.

In the second space forming member 52, the separation walls 523 adjacent to each other in the depth direction, the plate portions 521 disposed between the separation walls 523 adjacent to each other, and the second thermal insulation material 42 form a plurality of spaces 55. Moreover, the separation walls 523 adjacent to each other in the depth direction, the plate portions 522 disposed between the separation walls 523 adjacent to each other, and the second top wall 362 form a plurality of spaces 55. Furthermore, in an end portion 52e of the second space forming member 52 in which the second space forming member 52 faces the first space forming member 51, the plate portion 521 that forms the end portion 52e, the separation walls 523 connected to the plate portion 521 that forms the end portion 52e, the bent portion 362a of the second top wall 362, the extension portion 361b of the first top wall 361, and the second thermal insulation material 42 form a space 55.

In the outside casing 34, the partition member 410 that is a part of the thermal insulation material 41 extends into at least one of the plurality of spaces 55. For example, as shown in FIG. 7, the partition member 410 extends into the space 55 closest to the second top wall 362 among the plurality of spaces 55 formed between the first top wall 361 and the first thermal insulation material 41, i.e., extends into the space 55 formed by the plate portion 511 that forms the end portion 51e, the separation wall 513 connected to the plate portion 511 that forms the end portion 51e, and the bent portion 361a of the first top wall 361. It should be noted that a metal foil 45 such as an aluminum foil for reinforcing the first thermal insulation material 41 is bonded to the first thermal insulation material 41 on a side opposite to the first top wall 361. A metal foil 46 such as an aluminum foil for reinforcing the second thermal insulation material 42 is bonded to the second thermal insulation material 42 on a side opposite to the second top wall 362. That is, in the outside casing 34, a stack body including the top wall 360, the space forming member 50, the thermal insulation material 40, and the metal foils 45 and 46 is formed.

It should be noted that the thermal insulation material 40 and the space forming member 50 which have been described above are not limited to the top wall 360, and may be provided in at least either one of the first side wall 36a and the second side wall 36b in the inside space 39. Moreover, a structure in which the first space forming member 51 is not provided between the first top wall 361 and the first thermal insulation material 41 is also included in the present embodiment. In this case, the first thermal insulation material 41 is attached to the first top wall 361. Moreover, a structure in which the second space forming member 52 is not provided between the second top wall 362 and the second thermal insulation material 42 is also included in the present embodiment. In this case, the second thermal insulation material 42 is attached to the second top wall 362.

Figure 8:
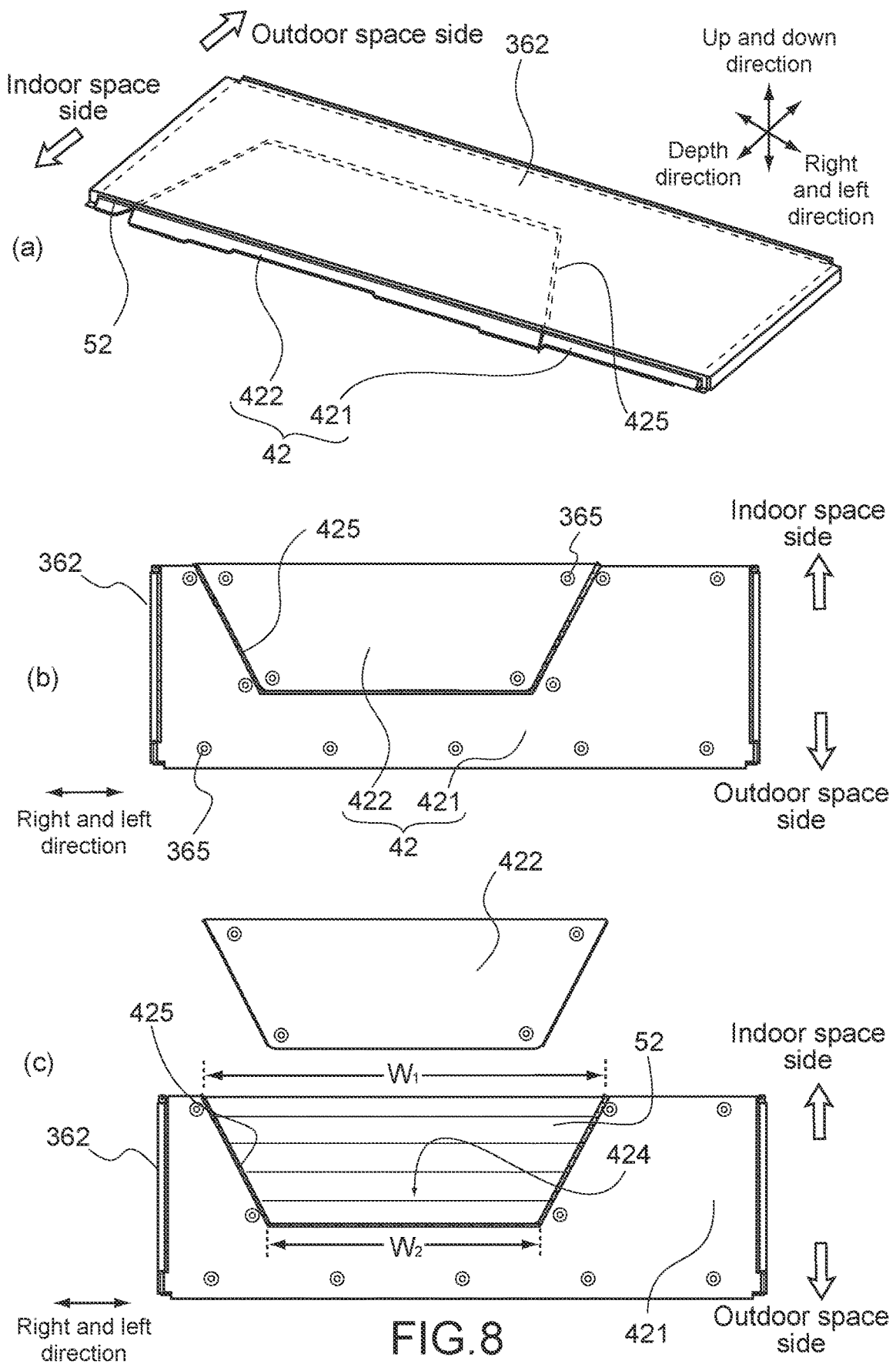
FIG. 8 Part (a) of the figure is a schematic perspective view of a second top wall of the top wall as viewed from the indoor space side. Part (b) and Part (c) of the figure are schematic plan views of the second top wall as viewed from the inside space side of the outside casing.

Part (a) of FIG. 8 is a schematic perspective view of a second top wall of the top wall 362 as viewed from the indoor space side. Part (b) and Part (c) of FIG. 8 are schematic plan views of the second top wall 362 as viewed from the inside space side of the outside casing.

As shown in Part (a) and Part (b) of FIG. 8, the second thermal insulation material 42 at least includes a first thermal insulation portion 421 and a second thermal insulation portion 422. The first thermal insulation portion 421 and the second thermal insulation portion 422 are disposed on the lower side of the second top wall 362. The second thermal insulation material 42 (the first thermal insulation portion 421 and the second thermal insulation portion 422) is attached to the second space forming member 52 with fixation members 365 such as screws. The second thermal insulation material 42 is not limited to the structure divided into two parts of the first thermal insulation portion 421 and the second thermal insulation portion 422, and may have a structure divided into three or more parts.

The second space forming member 52 is provided between each of the first thermal insulation portion 421 and the second thermal insulation portion 422 and the second top wall 362. The second space forming member 52 is fixed to the second top wall 362 by a technique such as soldering. Moreover, a wind-shielding material (elastic body) 425 is provided between the first thermal insulation portion 421 and the second thermal insulation portion 422. The wind-shielding material 425 is held in contact with the first thermal insulation portion 421 and the second thermal insulation portion 422. For example, the wind-shielding material 425 is adhered to the first thermal insulation portion 421. The second thermal insulation material 422 is merely held in contact with the wind-shielding material 425, and not adhered thereto. It should be noted that in the present embodiment, the wind-shielding material 425 is used as a first wind-shielding material.

The second thermal insulation material 42 has a divided structure in which the first thermal insulation portion 421 and the second thermal insulation portion 422 are divided. As shown in Part (b) of FIG. 8, the first thermal insulation portion 421 and the second thermal insulation portion 422 are individually fixed to the second space forming member 52 with the fixation members 365. Therefore, as shown in Part (c) of FIG. 8, it is possible to detach only the second thermal insulation portion 422 from the second top wall 362 by removing the fixation members 365 fixing the second thermal insulation portion 422, and it is also possible to re-attach the detached second thermal insulation portion 422 to the second top wall 362 with the fixation members 365.

The first thermal insulation portion 421 has a recess portion 424 in which the second thermal insulation portion 422 fits. The plane shape of the second thermal insulation portion 422 and the recess portion 424 is, for example, trapezoidal. As shown in Part (c) of FIG. 8, the recess portion 424 is formed so that in the right and left direction, a dimension (width) $W_1$ of the recess portion 424 on the indoor space side is larger than a dimension $W_2$ of the recess portion 424 on the outdoor space side and that the width dimension of the recess portion 424 becomes larger toward the indoor space side from the outdoor space side.

Figure 9:
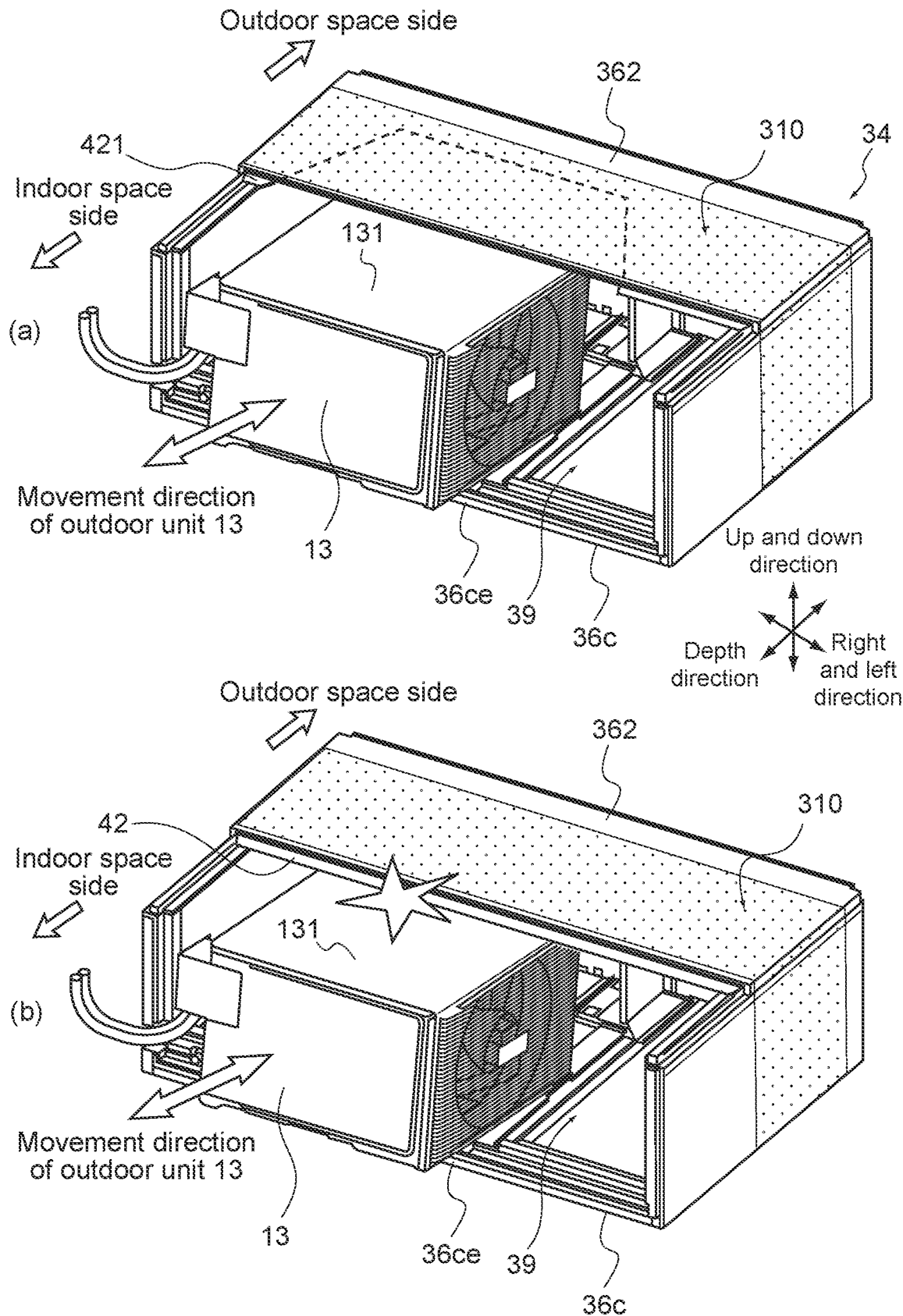
FIG. 9 Part (a) of the figure is a schematic perspective view showing actions in the case of using the outside casing according to the present embodiment. Part (b) of the figure is a schematic perspective view showing actions in the case of using an outside casing according to a comparative example.

Actions of the present embodiment will be described. Part (a) of FIG. 9 is a schematic perspective view showing actions in the case of using the outside casing 34 according to the present embodiment. Part (b) of FIG. 9 is a schematic perspective view showing actions in the case of using an outside casing according to a comparative example. Part (a) and Part (b) of FIG. 9 show movement states of the outdoor unit 13 when the outdoor unit 13 is manually installed (inserted) into the inside space 39 of the outside casing 34 from the indoor space or the outdoor unit 13 is pulled out from the inside space 39 to the indoor space after the first top wall 3641 and the front panel 37 are detached from the outside casing 34.

Since the first top wall 361 and the front panel 37 are positioned in the indoor space, they can be easily removed from the outside casing 34. However, since the second top wall 362 is fitted in the wall communication hole 31 (region 310), it cannot be easily detached from the outside casing 34.

In the comparative example shown in Part (b) of FIG. 9, the second thermal insulation material 42 is integrally formed under the second top wall 362 and the second thermal insulation material 42 does not have the divided structure. In such a structure, the height of the inside space 39 has limitations due to the thickness of the second thermal insulation material 42. As a result, a situation where a part of the outdoor unit 13, for example, an upper surface 131 of the outdoor unit 13 comes into contact with the second top wall 362 can occur when putting the outdoor unit 13 into the inside space 39 or taking out the outdoor unit 13 from the inside space 39. For example, for putting the outdoor unit 13 into the inside space 39 or taking out the outdoor unit 13 from the inside space 39 of the outside casing 34, the worker pushes the outdoor unit 13 into the inside space 39 or pulls out the outdoor unit 13 from the inside space 39 while lifting the front of the outdoor unit 13. As a result, during the work of putting the outdoor unit 13 into the inside space 39 or taking out the outdoor unit 13 from the inside space 39, the upper surface 131 of the outdoor unit 13 is lifted, such that the upper surface 131 of the outdoor unit 13 easily comes into contact with the second top wall 362. In particular, this operation easily occurs when putting the outdoor unit 13 into the inside space 39 or taking out the outdoor unit 13 from the inside space 39 while avoiding the bent portion 36*ce* of the bottom plate 36*c*.

Here, there is also a method of securing dimensions necessary for the work of inserting the outdoor unit 13 into the inside space 39 by detaching the entire second thermal insulation material 42 from the second top wall 362 to make the height of the inside space 39 larger than before the second thermal insulation material 42 is detached from the second top wall 362. However, in order to detach the entire integrally formed second thermal insulation material 42 from the second top wall 362, it is necessary for the worker to insert his or her hands into the inside space 39 of the outside casing 34 deeply (to the outdoor space side). Thus, the workability is low. Moreover, the work of removing all the fixation members 365 for fixing the second thermal insulation material 42 to the second top wall 362 is also necessary.

Thus, in the comparative example, the workability in installing the outdoor unit 13 that is a part of the air conditioner 11 into the outside casing 34 is not favorable.

In this regard, in the present embodiment shown in Part (a) of FIG. 9, the second thermal insulation material 42 has the divided structure and the second thermal insulation portion 422 on the indoor space side can be detached from the second top wall 362. Thus, after the second thermal insulation portion 422 is detached from the second top wall 362, the height of the inside space 39 (height of the inside space 39 under the recess portion 424) is higher than before it is detached. As a result, when putting the outdoor unit 13 into the inside space 39 or taking out the outdoor unit 13 from the inside space 39 while avoiding the bent portion 36*ce* of the bottom plate 36*c*, a part of the outdoor unit 13, for example, the upper surface 131 of the outdoor unit 13 is prevented from coming into contact with the second top wall 362.

Moreover, since the second thermal insulation material 42 has the divided structure, it is unnecessary to detach the entire second thermal insulation material 42 from the second top wall 362, and the worker only needs to detach the second thermal insulation portion 422 disposed in the front from the second top wall 362. Moreover, the worker only needs to perform the work of removing the fixation members 365 fixing the second thermal insulation portion 422 that is a part of the second thermal insulation material 42. Moreover, the first thermal insulation portion 421 has the recess portion 424 in which the second thermal insulation portion 422 fits and which is formed so that the dimension (width) $W_1$ of the recess portion 424 on the indoor space side is larger than the dimension $W_2$ of the recess portion 424 on the outdoor space side in the right and left direction, and that the width dimension of the recess portion 424 becomes larger toward the indoor space side from the outdoor space side. Accordingly, after putting the outdoor unit 13 in the outside casing 34, it is possible to slide the recess portion 424 in the depth direction toward the outdoor space side from the front of the outside casing 34 for inserting the second thermal insulation portion 422 into the recess portion 424. Thus, the second thermal insulation portion 422 can be reliably inserted into the recess portion 424.

Thus, in the present embodiment, the workability in installing the outdoor unit 13 that is a part of the air conditioner 11 into the outside casing 34 becomes favorable.

Moreover, the wind-shielding material 425 is disposed between the first thermal insulation portion 421 and the second thermal insulation portion 422. After the second thermal insulation portion 422 is fitted in the recess portion 424 of the first thermal insulation portion 421, the wind-shielding material 425 is pressed from each of the first thermal insulation portion 421 and the second thermal insulation portion 422, such that the wind-shielding material 425 is held in close contact with the first thermal insulation portion 421 and the second thermal insulation portion 422. Accordingly, even in the case where the second thermal insulation material 42 has the divided structure, flowing of the outdoor air into a gap between the first thermal insulation portion 421 and the second thermal insulation portion 422 is suppressed. As a result, cooling of the second top wall 362 due to the outdoor air flowing into the inside space 39 is suppressed and the occurrence of the condensation in the outside casing 34 positioned in the indoor space is suppressed.

Moreover, in the outside casing 34 according to the present embodiment, the space forming member 50 including the spaces 55 forming an air layer with heat conductivity lower than that of the thermal insulation material 40 is provided between the top wall 360 and the thermal insulation material 40. As a result, sufficient thermal insulation properties between the indoor space and the inside space 39 of the outside casing 34 are secured.

Moreover, the separation walls 513 and 523 of the space forming member 50 separate the area between the outside casing 34 and the thermal insulation material 40 into the plurality of spaces 55. As a result, the air convection (e.g., air convection in the depth direction) is suppressed between the outside casing 34 and the thermal insulation material 40, and thermal insulation properties between the indoor space and the inside space 39 of the outside casing 34 are further secured. For example, in the present embodiment, the plurality of spaces 55 is defined below the first top wall 361 and the second top wall 362. As a result, heat conduction due to the air moving below the second top wall 362 closer to the outdoor space does not easily affect on the first top wall 361 side. Moreover, since the space is further divided into the plurality of spaces 55 below each of the first top wall 361 and the second top wall 362, the heat conduction from the outdoor space side to the indoor space side due to the air convection is suppressed.

Moreover, in the present embodiment, the top wall 360 is divided into the first top wall 361 disposed in the indoor space and the second top wall 362 disposed in the outdoor space from the wall communication hole 31. By setting the top wall 360 to have the divided structure, mutual heat conduction between the first top wall 361 and the second top wall 362 is suppressed.

Moreover, in the present embodiment, the part (partition member 410) of the thermal insulation material 40 extends into the at least one of the plurality of spaces 55 of the space forming member 50. For example, the part of the thermal insulation material 40 extends into the space 55 closest to the second top wall 362 among the plurality of spaces 55 formed by the first space forming member 51. As a result, mutual heat conduction between the first space forming member 51 and the second space forming member 52 is suppressed, and thus the mutual heat conduction between the first top wall 361 and the second top wall 362 is suppressed. As a result, thermal insulation properties between the indoor space and the inside space 39 of the outside casing 34 are further secured.

Moreover, in the present embodiment, the boundary 360B between the first top wall 361 and the second top wall 362 is positioned at an open end 310e of the wall communication hole 31. As a result, the first top wall 361 can be easily attached to the outside casing 34 or easily detached from the outside casing 34 without being affected by the wall communication hole 31. Moreover, if the boundary 360B is extremely deviated on the indoor space side, the second top wall 362 is exposed in the indoor space, and condensation easily occurs on the second top wall 362 in the indoor space. Thus, it is favorable to locate the boundary 360B between the first top wall 361 and the second top wall 362 at the open end 310e of the wall communication hole 31.

Moreover, the elastic body 60 is provided between the first thermal insulation material 41 and the second thermal insulation material 42. The elastic body 60 functions as a wind-shielding material. For example, after the elastic body 60 is sandwiched between the first thermal insulation material 41 and the second thermal insulation material 42, the elastic body 60 is pressed from each of the first thermal insulation material 41 and the second thermal insulation material 42, such that the elastic body 60 is held in close contact with the first thermal insulation material 41 and the second thermal insulation material 42. Accordingly, flowing of the outdoor air into the gap between the first thermal insulation material 41 and the second thermal insulation material 42 is suppressed. As a result, thermal insulation properties between the indoor space and the inside space 39 of the outside casing 34 are further secured.

It should be noted that in the second thermal insulation material 42 with the divided structure, the plane shape of the second thermal insulation portion and the recess portion is not limited to the trapezoidal shape. Part (a) and Part (b) of FIG. 10 are schematic cross-sectional views showing another example of the second thermal insulation material.

Figure 10:
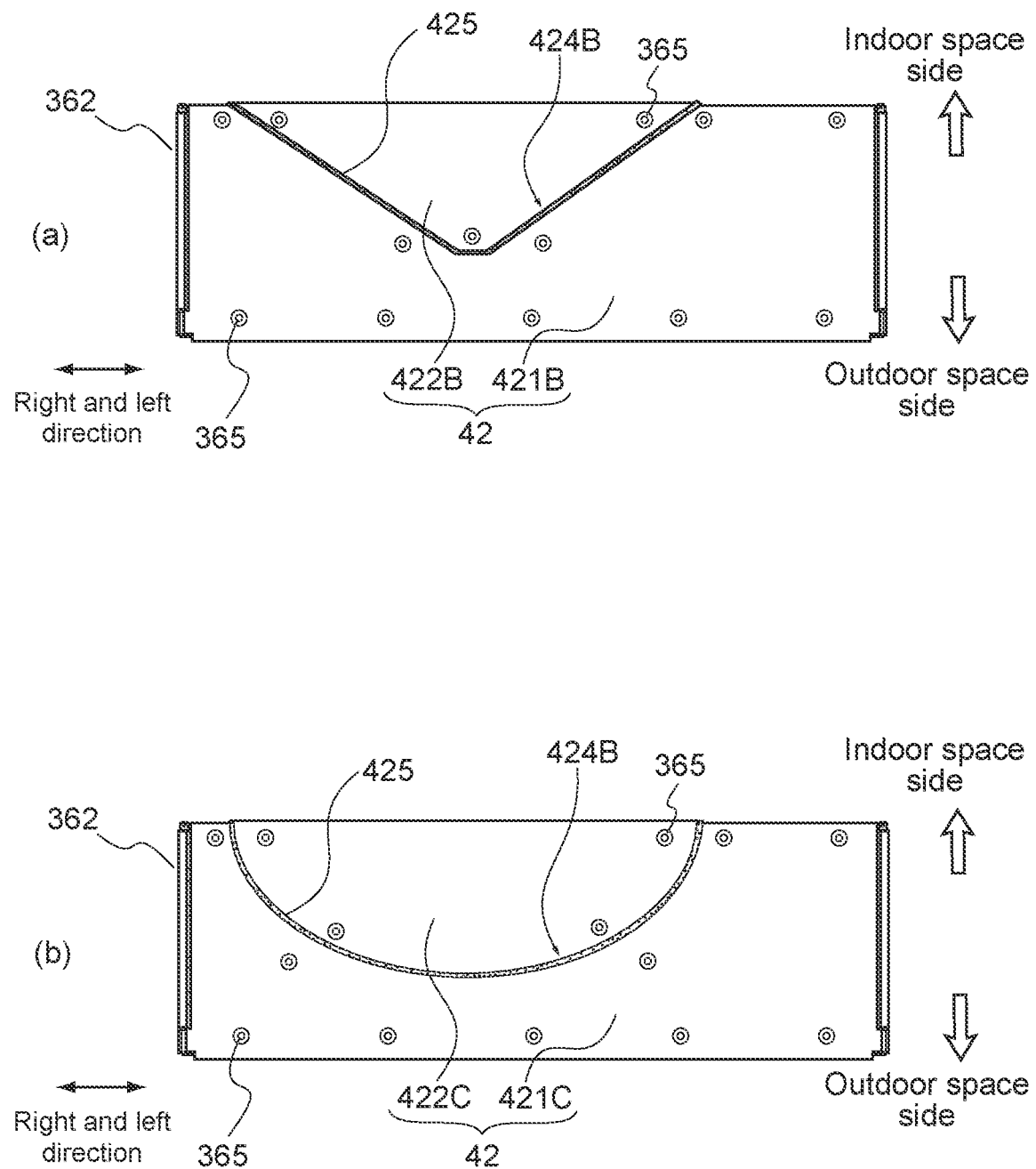
FIG. 10 A schematic cross-sectional view showing another example of a second thermal insulation material.

For example, in the example shown in Part (a) of FIG. 10, a recess portion 424B and a second thermal insulation portion 422B which are provided in a first thermal insulation portion 421B are triangular. Also regarding the recess portion 424B, its width in the right and left direction becomes larger toward the indoor space from the outdoor space. The second thermal insulation portion 422B can be attached to the second top wall 362 by fitting the triangular portion into the recess portion 424B and can be detached from the second top wall 362. In the example shown in Part (b) of FIG. 10, a recess portion 424C and a second thermal insulation portion 422C which are provided in a first thermal insulation portion 421C have a circular arc shape. Also regarding the recess portion 424C, its width in the right and left direction becomes larger toward the indoor space from the outdoor space. The second thermal insulation portion 422C can be attached to the second top wall 362 by fitting the circular arc-shaped portion into the recess portion 424C and can be detached from the second top wall 362. Similar to the first thermal insulation portion 421 described so far, such a structure is also included in the present embodiment because it is formed so that in the right and left direction, the dimension on the indoor space side is larger than the dimension on the outdoor space side and that the width dimension becomes larger toward the indoor space side from the outdoor space side.

Moreover, the second space forming member 52 provided between the second top wall 362 and the second thermal insulation material 42 may have the divided structure. Part (a) of FIG. 11 is a schematic perspective view showing another example of a second space forming member. Part (b) of FIG. 11 is a schematic cross-sectional view showing another example of the second space forming member.

For example, the second space forming member 52 includes a first member 52a provided between the second top wall 362 and the first thermal insulation portion 421 and a second member 52b provided between the second top wall 362 and the second thermal insulation portion 422. The first member 52a is fixed to the second top wall 362 by a technique such as soldering. The second member 52b is fixed to the second top wall 362 by a technique such as screwing.

The second member 52b can be detached from the second top wall 362 together with the second thermal insulation portion 422 by releasing the screwing, for example. Detaching the second thermal insulation portion 422 and the second member 52b from the second top wall 362 increases the height of the inside space 39 of the outside casing 34, and the workability in installing the outdoor unit 13 into the inside space 39 is further improved. Such a structure is also included in the present embodiment.

Moreover, the structure of the top wall 360 is not limited to the divided structure divided into the first top wall 361 and the second top wall 362. The top wall 360 may be formed by a top wall in which the first top wall 361 and the second top wall 362 are integrated. In this case, the first space forming member 51 and the second space forming member 52 are arranged side by side in the depth direction below the integrated top wall 360. Moreover, the first thermal insulation material 41 is disposed below the first space forming member 51 and the second thermal insulation material 42 is disposed below the second space forming member 52. In addition, the second thermal insulation material 42 includes the first thermal insulation portion 421 having the recess portion 424 and the second thermal insulation portion 422 that is housed in the recess portion 424 and is attachable and detachable to/from the recess portion 424.

Figure 12:
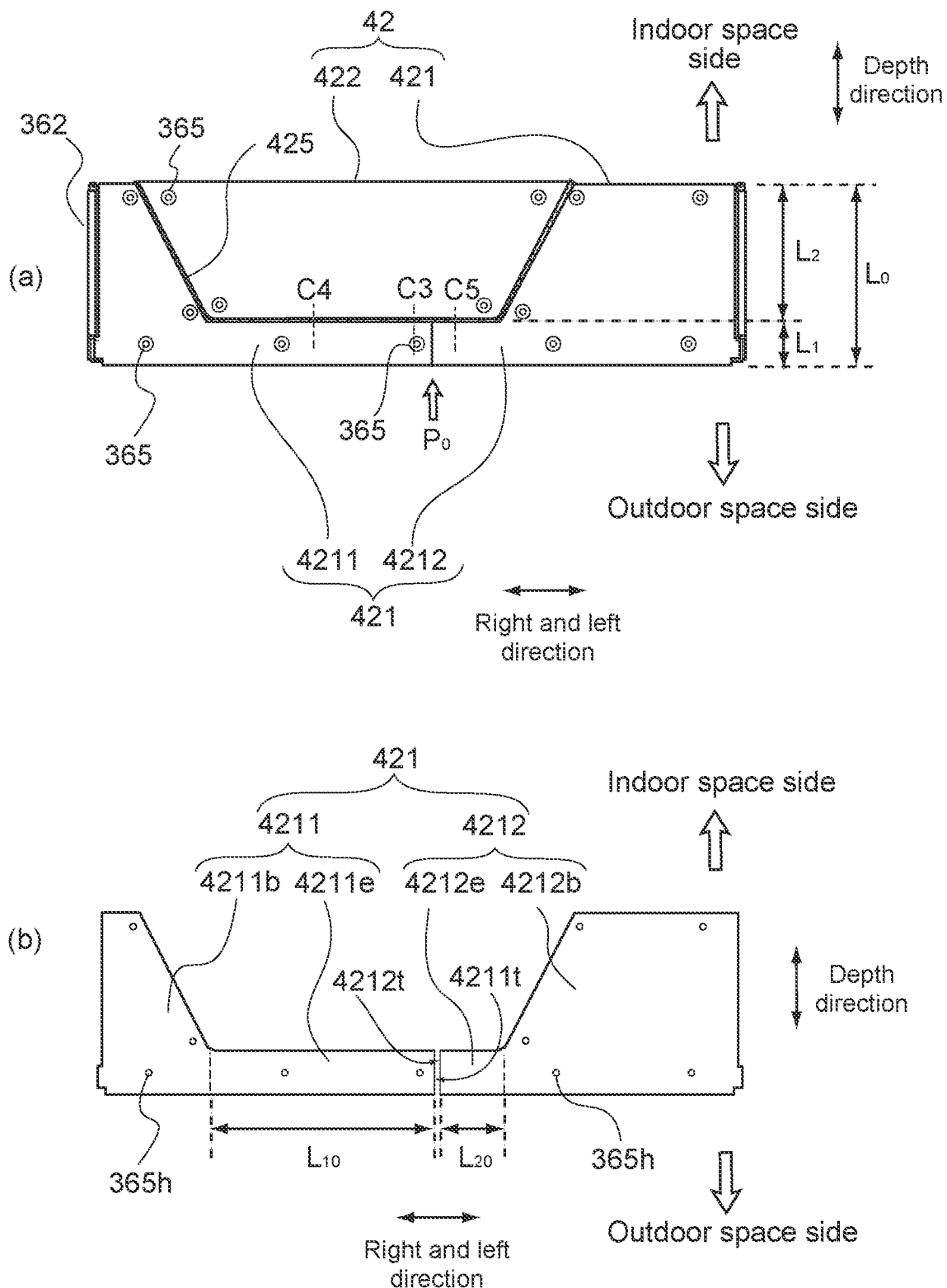
FIG. 12 Part (a) of the figure is a schematic plan view showing still another example of the second thermal insulation material. Part (b) of the figure is a schematic plan view showing a first thermal insulation portion of the second thermal insulation material.

Part (a) of FIG. 12 is a schematic plan view showing still another example of the second thermal insulation material. Part (b) of FIG. 12 is a schematic plan view showing the first thermal insulation portion of the second thermal insulation material.

The first thermal insulation portion 421 of the second thermal insulation material 42 may be divided into at least a first thermal insulation member 4211 and a second thermal insulation member 4212. The first thermal insulation portion 421 is not limited to an example in which it is divided into the first thermal insulation member 4211 and the second thermal insulation member 4212, and may be divided into three or more.

As shown in Part (b) of FIG. 12, the first thermal insulation member 4211 of the first thermal insulation portion 421 includes a first base portion 4211b and a first extension portion 4211e extending from the first base portion 4211b. Moreover, the second thermal insulation member 4212 includes a second base portion 4212b and a second extension portion 4212e extending from the second base portion 4212b. The first extension portion 4211e and the second extension portion 4212e are arranged side by side in the right and left direction. The first extension portion 4211e and the second extension portion 4212e are provided between the first base portion 4211b and the second base portion 4212b in the right and left direction. The area of the second base portion 4212b is larger than the area of the first base portion 4211b. The area of the first extension portion 4211e is larger than the area of the second extension portion 4212e.

Moreover, through-holes 365h are provided in the first thermal insulation portion 421. Attachment members 366 (to be described later), to which the fixation members 365 are fixed by screwing, penetrate through the through-holes 365h.

Here, "$L_0$" shown in Part (a) of FIG. 12 denotes a length of the first thermal insulation portion 421 in the indoor and outdoor direction and "$L_1$" denotes a length of the first extension portion 4211e and the second extension portion 4212e in the indoor and outdoor direction. "$L_2$" denotes a length of the second thermal insulation portion 422 in the indoor and outdoor direction. "$L_{10}$" shown in Part (b) of FIG. 12 denotes a length of the first extension portion 4211e in the right and left direction (direction perpendicular to the indoor and outdoor direction). "$L_{20}$" denotes a length of the second extension portion 4212e in the right and left direction.

The longest dimension of the first thermal insulation portion 421 in the indoor and outdoor direction is the length of the first base portion 4211b and the second base portion 4212b in the indoor and outdoor direction, and it is $L_0$. The length $L_{10}$ of the first extension portion 4211e is longer than the length $L_{20}$ of the second extension portion 4212e. Moreover, in the indoor and outdoor direction, the length of the first extension portion 4211e is shorter than the length of the first base portion 4211b. Moreover, in the indoor and outdoor direction, the length of the second extension portion 4212e is shorter than the length of the second base portion 4212b. Moreover, the length $L_{10}$ of the first extension portion 4211e in the right and left direction is longer than the length $L_{20}$ of the second extension portion 4212e in the right and left direction.

Moreover, the first thermal insulation member 4211 has a first end surface 4211t. The second thermal insulation member 4212 has a second end surface 4212t. The first end surface 4211t is provided at an end portion of the first extension portion 4211e. The second end surface 4212t is provided at an end portion of the second extension portion 4212e. The first end surface 4211t and the second end surface 4212t face each other in the right and left direction. It should be noted that the term "face" in the present embodiment means a state in which two members face each other with a predetermined distance therebetween and also means a state in which two members are in contact with each other.

The length of the wall communication hole 31 in the indoor and outdoor direction varies depending on the thickness of the building wall 29 (FIG. 2). In the case of installing the outside casing 34 in the wall communication hole 31, the length of the region 310 arranged in the wall communication hole 31 in the indoor and outdoor direction shown in FIG. 5 is changed, i.e., the first thermal insulation portion 421 having a length $L_0$ depending on the length of the second top wall 362 in the indoor and outdoor direction is formed without changing the dimensions of the portion projecting to the indoor shown in FIG. 3. Here, in the case of reducing the length $L_0$ in accordance with a shorter wall communication hole 31, it is favorable to reduce the length $L_1$ of the first thermal insulation portion 421 without changing the length $L_2$ of the second thermal insulation portion 422 in the indoor and outdoor direction in order to secure the workability in putting the outdoor unit 13 in the inside space 39 of the outside casing 34, which has been described above with reference to Part (a) of FIG. 9.

As described above, if the length $L_1$ of the first extension portion 4211e and the second extension portion 4212e is reduced when reducing the length $L_0$ of the first thermal insulation portion 421, the mechanical strength of each of the first extension portion 4211e and the second extension portion 4212e decreases. In particular, in the case where the first thermal insulation member 4211 and the second thermal insulation member 4212 are integrated, not divided, the first base portion 4211b and the second base portion 4212b are disposed on both sides of an elongated extension portion in which the first extension portion 4211e and the second extension portion 4212e connect to each other.

In the case where the first thermal insulation portion 421 is formed by molding, for example, if the length $L_1$ of the first extension portion 4211e is short, there is a possibility that the first extension portion 4211e is broken due to a force added to the first extension portion 4211e when removing the first thermal insulation portion 421 from a mold after molding. Specifically, when removing the first thermal insulation portion 421 from the mold, it is more difficult to remove the first base portion 4211b with a larger area than that of the first extension portion 4211e from the mold than the first extension portion 4211e, and the first extension portion 4211e will be broken when a force is added for removing the first base portion 4211b from the mold. Moreover, also when transporting the first thermal insulation portion 421 removed from the mold for the next step or when performing the work of assembling the first thermal insulation portion 421 to the outside casing 34, there is a possibility that the first extension portion 4211e is broken due to an applied force. Specifically, since the first base portion 4211b is heavier than the first extension portion

4211e, the extension portion will be broken due to their weight when the worker holds the first base portion 4211b during the transportation or the assembling work as described above. A similar situation can also occur in the second extension portion 4212e of the second thermal insulation portion 422.

In view of this, in the present embodiment, the portion sandwiched between the first base portion 4211b and the second base portion 4212b, i.e., the above-mentioned extension portion is divided into the first extension portion 4211e and the second extension portion 4212e. As a result, the first thermal insulation portion 421 is divided into the first thermal insulation member 4211 and the second thermal insulation member 4212. By dividing the first thermal insulation portion 421 into the first thermal insulation member 4211 and the second thermal insulation member 4212 in this manner, each of the first thermal insulation member 4211 and the second thermal insulation member 4212 is hardly damaged when removing the first thermal insulation portion 421 from the mold or during the transportation of the first thermal insulation portion 421 or during the assembling work.

Moreover, in the present embodiment, regarding the first thermal insulation portion 421, an example in which the length $L_{10}$ of the first extension portion 4211e is set to be longer than the length $L_{20}$ Of the second extension portion 4212e and the area of the second base portion 4212b is larger than the area of the first base portion 4211b is shown. Here, the case where the length $L_{20}$ of the second extension portion 4212e is larger than the length $L_{10}$ of the first extension portion 4211e is assumed. In such a case, there is a possibility that when the worker holds the second extension portion 4212e of the second thermal insulation member 4212 for removing the second thermal insulation member 4212 from the mold after the second thermal insulation member 4212 is molded or for transporting or assembling the second thermal insulation member 4212, a force due to the weight of the second base portion 4212b larger in area acts on the elongated second extension portion 4212e and the second thermal insulation member 4212 is broken or cracked.

In this regard, as in the example of the present embodiment, in the case where the length $L_{20}$ of the second extension portion 4212e is set to be shorter than the length $L_{10}$ of the first extension portion 4211e, the second extension portion 4212e is hardly broken and cracked even if a force due to the weight of the second base portion 4212b is added to the second extension portion 4212e.

Moreover, in the first thermal insulation member 4211, an example in which the first extension portion 4211e with the length $L_{10}$ longer than the length $L_{20}$ of the second extension portion 4212e is continuous with the first base portion 4211b is shown. In such a case, the area of the first base portion 4211b is smaller than the area of the second base portion 4212b. As a result, the first base portion 4211b is lighter than the second base portion 4212b. Accordingly, even if a force due to the weight of the first base portion 4211b is added to the first extension portion 4211e, the first base portion 4211b is hardly broken and cracked, and thus the length $L_{10}$ of the first extension portion 4211e can be set to be larger than the length $L_{20}$ of the second extension portion 4212e.

Figure 13:
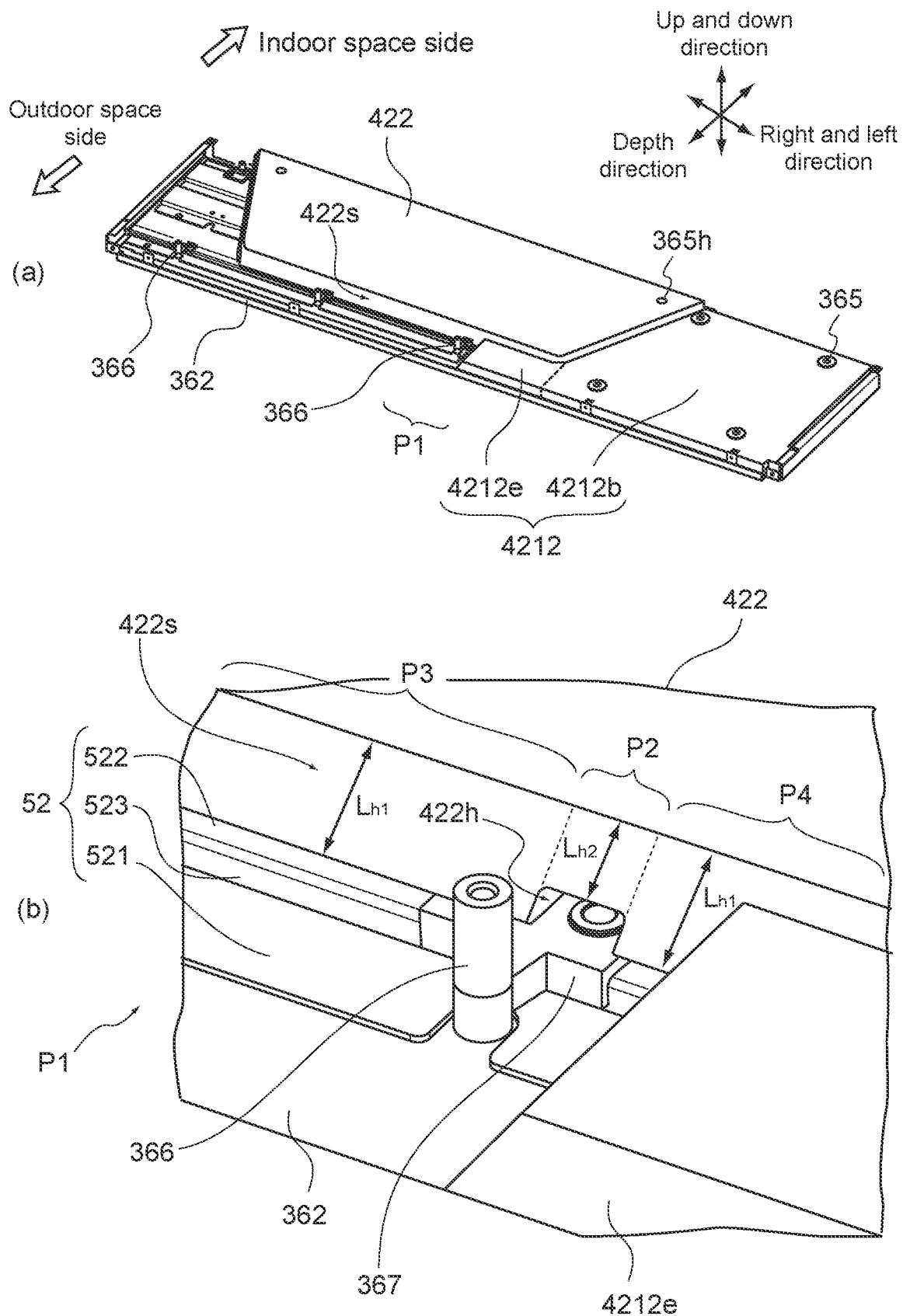
FIG. 13 Part (a) of the figure is a schematic perspective view after a first thermal insulation member of the first thermal insulation portion is removed from the second top wall. Part (b) of the figure is a schematic perspective view of a portion in which the first extension portion of the first thermal insulation member and the second extension portion of the second thermal insulation member face each other in an enlarged state.

Part (a) of FIG. 13 is a schematic perspective view in which the first thermal insulation member of the first thermal insulation portion is removed from the second top wall. Part (b) of FIG. 13 is a schematic perspective view of a portion in which the first extension portion of the first thermal insulation member and the second extension portion of the second thermal insulation member face each other (portion P1 shown in Part (a) of FIG. 13) in an enlarged state. It should be noted that in Part (a) and Part (b) of FIG. 13, the wind-shielding material 425 disposed between the first thermal insulation portion 421 and the second thermal insulation portion 422 is not shown.

As shown in Part (a) of FIG. 13, the first thermal insulation member 4211 can be detached from the second top wall 362 by releasing the fixation to the second top wall 362 with the fixation members 365. It should be noted that Part (a) of FIG. 13 shows a state in which the second thermal insulation member 4212 is fixed to the second top wall 362 with the fixation members 365. Moreover, regarding the second thermal insulation portion 422, a state in which the fixation members 365 fixing the second thermal insulation portion 422 to the second top wall 362 is released and the second thermal insulation portion 422 is slightly spaced apart from the second top wall 362 is shown. It should be noted that the second thermal insulation member 4212 and the second thermal insulation portion 422 can also be detached from the second top wall 362 as in the first thermal insulation member 4211.

The fixation members 365 is attached to the attachment members 366 provided in the second top wall 362 by screwing for example (Part (b) of FIG. 13). The attachment members 366 are provided perpendicular to the second top wall 362. Here, the term "perpendicular" means a perfectly perpendicular state and also means a slightly non-perpendicular state due to an error. The attachment members 366 are, for example, pipe nuts or the like and the fixation members 365 are fixed to the attachment members 366 by fastening the fixation members 365 such as screws to the attachment members 366. In addition, the attachment members 366 are supported by supporting members 367 provided on the second top wall 362, for example. The supporting members 367 are provided in the plate portions 522 and the separation walls 523 of the second space forming member 52, for example.

In the first thermal insulation portion 421, the first base portion 4211b of the first thermal insulation member 4211 and the first extension portion 4211e of the first thermal insulation member 4211 are fixed to the second top wall 362 with the fixation members 365 and the second base portion 4212b of the second thermal insulation member 4212 is fixed to the second top wall 362 with the fixation members 365. The second extension portion 4212e of the second thermal insulation member 4212 is pressed to the second top wall 362 side by the first extension portion 4211e of the first thermal insulation member 4211. A structure in which the second extension portion 4212e is pressed by the first extension portion 4211e will be described later.

An end surface 422s at which the second thermal insulation portion 422 faces the first thermal insulation portion 421 is a tilt surface. An angle formed by the end surface 422s and a surface of the first thermal insulation portion 421, which comes into contact with the second top wall 362, is, for example, an acute angle. In the second thermal insulation portion 422, a groove-like recess portion 422h shown in Part (b) of FIG. 13 is provided in a surface in which the second thermal insulation portion 422 faces the second top wall 362 in order to prevent the second thermal insulation portion 422 from coming into contact with the supporting members 367. Due to the provision of such a recess portion 422h in the second thermal insulation portion 422, a length $L_{h2}$ of the portion P2 of the end surface 422s in which the recess portion 422h is provided is shorter than a length Lmi of the end surface 422s in the portions P3 and P4 of the end surface 422s in which the recess portion 422h is not provided. Here, the length of the end surface 422s is a width of the tilt surface formed by the end surface 422s.

Figure 14:
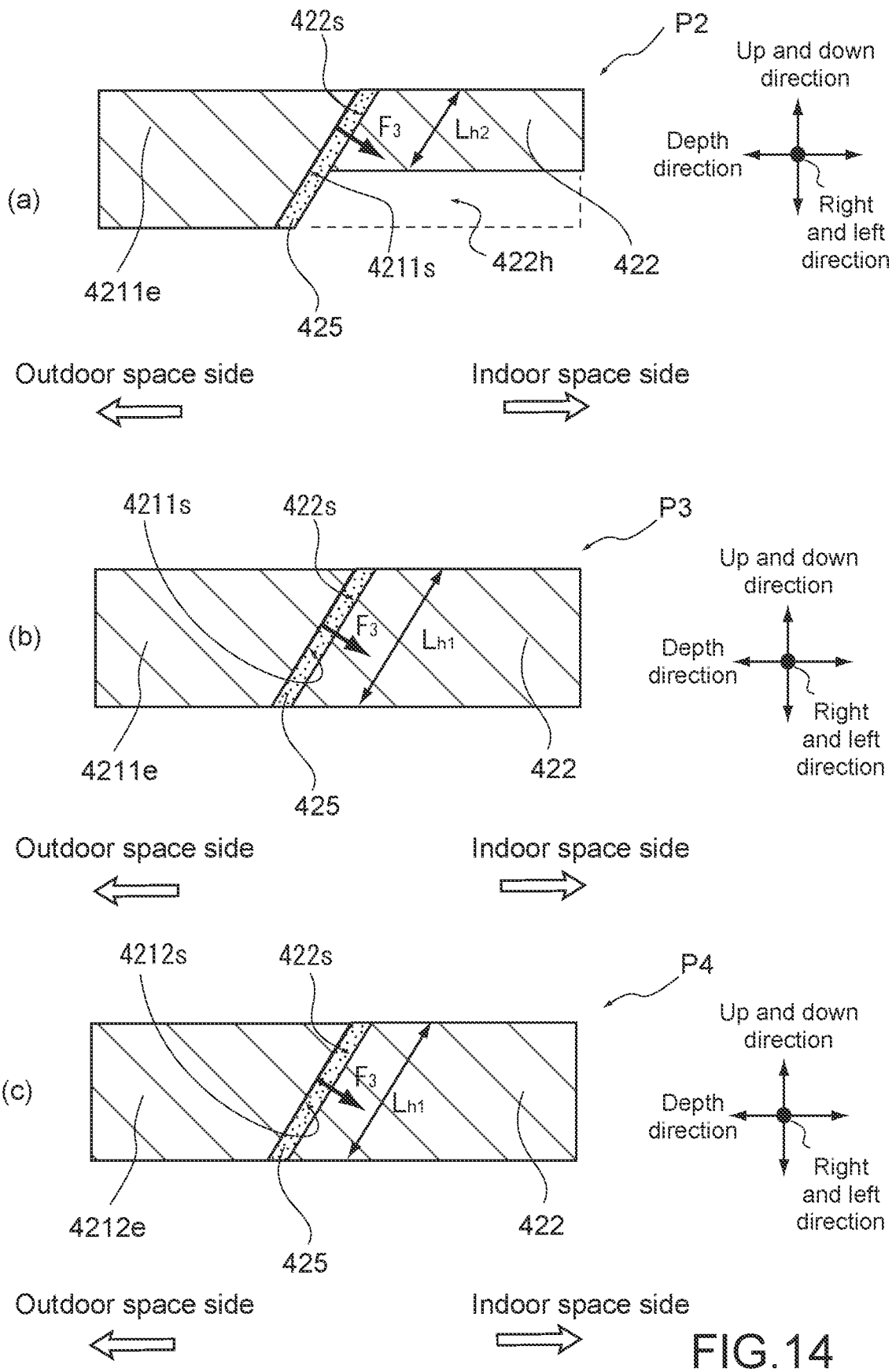
FIG. 14 Part (a) of the figure is a schematic cross-sectional view in an area corresponding to a portion P2, which is a part of an area where the first thermal insulation portion and the second thermal insulation portion face each other. Part (b) of the figure is a schematic cross-sectional view in an area corresponding to a portion P3, which is a part of an area where the first thermal insulation portion and the second thermal insulation portion face each other. Part (c) of the figure is a schematic cross-sectional view in an area corresponding to a portion P4, which is a part of an area where the first thermal insulation portion and the second thermal insulation portion face each other.

Part (a) of FIG. 14 is a schematic cross-sectional view in an area corresponding to the above-mentioned portion P2, which is a part of an area where the first thermal insulation portion and the second thermal insulation portion face each other. Here, the portion P2 is a region of the end surface 422s in which the recess portion 422h is provided. Part (a) of FIG. 14 shows a cross-section taken along the long dashed short dashed line C3 in Part (a) of shown in FIG. 12. Part (b) of FIG. 14 is a schematic cross-sectional view in an area corresponding to the above-mentioned portion P3, which is a part of an area where the first thermal insulation portion and the second thermal insulation portion face each other. The portion P3 is a region of the end surface 422s on the left side of the portion P2 shown in Part (b) of FIG. 13 (region in the end surface 422s where the recess portion 422h is not provided on the left side of the portion P2). Part (b) of FIG. 14 shows a cross-section taken along the long dashed short dashed line C4 in Part (a) of shown in FIG. 12. Part (c) of FIG. 14 is a schematic cross-sectional view in an area corresponding to the above-mentioned portion P4, which is a part of an area where the first thermal insulation portion and the second thermal insulation portion face each other. The portion P4 is a region of the end surface 422s on the right side of the portion P2 shown in Part (b) of FIG. 13 (region in the end surface 422s where the recess portion 422h is not provided on the right side of the portion P2). Part (c) of FIG. 14 shows a cross-section taken along the long dashed short dashed line C5 in Part (a) of shown in FIG. 12. In Part (a) and Part (b) of FIG. 14, the first extension portion 4211e is illustrated as the first thermal insulation portion 421. In Part (c) of FIG. 14, the second extension portion 4212e is illustrated as the first thermal insulation portion 421.

As shown in Part (a) and Part (b) of FIG. 14, an end surface 4211s in which the first extension portion 4211e of the first thermal insulation portion 421 faces the second thermal insulation portion 422 is, for example, a tilt surface. Moreover, as shown in Part (c) of FIG. 14, an end surface 4212s in which the second extension portion 4212e of the first thermal insulation portion 421 faces the second thermal insulation portion 422 is, for example, a tilt surface. The end surface 422s is a tilt surface parallel to the end surface 4211s and the end surface 4212s. Moreover, the wind-shielding material 425 is provided between the end surface 4211s and the end surface 422s and between the end surface 4212s and the end surface 422s. It should be noted that the term "parallel" in the present embodiment may mean a perfectly parallel state, may mean a non-perfectly parallel state, or may include a non-parallel state due to an error, for example, a variation in dimension in the manufacture of each thermal insulation member or a variation in assembling when each thermal insulation member is assembled to the outside casing. Moreover, the non-parallel state includes a state in which a pressure from the pressing surface can be applied to the action surface and a state a state in which the air-tightness between the pressing surface and the action surface can be maintained when the wind-shielding material provided between the pressing surface and the action surface is compressed.

The tilt surface formed by the end surface 4211s is not limited to the first extension portion 4211e, and the tilt surface may also be employed as the end surface where the first base portion 4211b faces the second thermal insulation portion 422. Moreover, the tilt surface formed by the end surface 4212s is not limited to the second extension portion 4212e, and a tilt surface may also be employed as an end surface where the second base portion 4212b faces the second thermal insulation portion 422. Moreover, the tilt surface formed by the end surface 422s is not limited to the second extension portion 4212e, and a tilt surface may also be employed as the end surface where the second base portion 4212b faces the second thermal insulation portion 422. That is, the end surface of the first thermal insulation portion 421 which faces the second thermal insulation portion 422 is a tilt surface and the end surface of the second thermal insulation portion 422 which faces the first thermal insulation portion 421 is a tilt surface parallel to each end surface of the first thermal insulation portion 421.

As shown in Part (b) of FIG. 13, in the portion P2, the recess portion 422h is provided in the end surface 422s of the second thermal insulation portion 422 so as not to touch the supporting member 36. As a result, in the cross-section in the portion P2, as shown in Part (a) of FIG. 14, the end surface 4211s of the first extension portion 4211e comes into contact with the end surface 422s of the second thermal insulation portion 422, which has with the length $L_{h2}$, via the wind-shielding material 425. As a result, a part of the end surface 4211s of the first extension portion 4211e comes into contact with the end surface 422s of the second thermal insulation portion 422 via the wind-shielding material 425.

On the other hand, in the portion P3, as shown in Part (b) of FIG. 13, the recess portion 422h is not provided in the end surface 422s of the second thermal insulation portion 422. As a result, in the portion P3, as shown in Part (b) of FIG. 14, the end surface 4211s of the first extension portion 4211e comes into contact with the end surface 422s of the second thermal insulation portion 422, which has with the length $L_{h1}$, via the wind-shielding material 425. As a result, the entire region of the cross-section of the end surface 4211s of the first extension portion 4211e comes into contact with the end surface 422s of the second thermal insulation portion 422 via the wind-shielding material 425.

Moreover, in the portion P4, as shown in Part (b) of FIG. 13, the recess portion 422h is not provided in the end surface 422s of the second thermal insulation portion 422. As a result, in the portion P4, as shown in Part (c) of FIG. 14, the end surface 4212s of the second extension portion 4212e comes into contact with the end surface 422s of the second thermal insulation portion 422, which has the length $L_{h1}$, via the wind-shielding material 425. As a result, the entire region of the cross-section of the end surface 4212s of the second extension portion 4212e is held in contact with the second thermal insulation portion 422 via the wind-shielding material 425.

In order to improve wind-shielding properties between the first thermal insulation portion 421 and the second thermal insulation portion 422, it is favorable to reduce the number of recess portions 422h and increase the contact area between the tilt surfaces. For example, as compared to the case where the end surface 422s provided with the recess portion 422h and the end surface 4211s are held in contact with each other via the wind-shielding material 425, in the case where the end surface 422s not provided with the recess portion 422h and the end surface 4211s are held in contact with each other via the wind-shielding material 425, the contact area between the tilt surfaces via the wind-shielding material 425 increases, and therefore the wind-shielding properties between the first thermal insulation portion 421 and the second thermal insulation portion 422 are improved.

Moreover, in order to further improve the wind-shielding properties between the first thermal insulation portion 421 and the second thermal insulation portion 422, it is favorable to generate a pressure to press the end surface 422s of the second thermal insulation portion 422 from the end surface 4211s of the first thermal insulation portion 421 via the wind-shielding material 425. Such a pressure can be applied by fixing the first thermal insulation portion 421 to the second top wall 362 with the fixation members 365.

Here, the first extension portion 4211e of the first thermal insulation portion 421 is fixed to the second top wall 362 with the plurality of fixation members 365 as shown in Part (a) of FIG. 12. Thus, even if the recess portion 422h is provided in the second thermal insulation portion 422, the first extension portion 4211e is pushed to the second top wall 362 side with the fixation members 365. As a result, a pressure $F_3$ acts on the end surface 422s from the end surface 4211s via the wind-shielding material 425. As a result, between the first extension portion 4211e of the first thermal insulation portion 421 and the second thermal insulation portion 422, the air-tightness between the end surface 4211s and the end surface 422s is maintained by the wind-shielding material 425 being compressed by the end surface 4211s and the end surface 422s.

On the other hand, the length in the right and left direction of the second extension portion 4212e of the first thermal insulation portion 421 is $L_{20}$ shorter than $L_{10}$ as shown in Part (b) of FIG. 12, and therefore the second extension portion 4212e is not fixed to the second top wall 362 with the fixation members 365 (Part (a) of FIG. 12). Here, the case where the second extension portion 4212e is fixed to the second top wall 362 with the fixation members 365 is assumed. In this case, it is necessary to form the recess portion 422h in the end surface 422s of the second thermal insulation portion 422 that the end surface 4212s of the second extension portion 4212e faces in order to prevent the second extension portion 4212e from touching the supporting members 367 that supports the attachment members 366 for fixing the fixation members 365. As a result, in the second extension portion 4212e, the contact area between the end surface 4212s of the second extension portion 4212e and the end surface 422s of the second thermal insulation portion 422 decreases. In particular, the length $L_{20}$ of the second extension portion 4212e is shorter than the length $L_{10}$ of the first extension portion 4211e. If the recess portion 422h is formed in the second thermal insulation portion 422 in such a shorter second extension portion 4212e, the contact area between the end surface 4212s and the end surface 422s decreases.

Therefore, in the present embodiment, the supporting members 367 are not arranged below the second thermal insulation portion 422 that the second extension portion 4212e faces, the recess portion 422h is not provided in the end surface 422s of the second thermal insulation portion 422 that the second extension portion 4212e faces, and a pressure received by the second extension portion 4212e from the first extension portion 4211e is utilized. In this manner, wind-shielding properties between the second extension portion 4212e and the second thermal insulation portion 422 and the wind-shielding properties between the first extension portion 4211e and the second extension portion 4212e are also improved. Hereinafter, its actions will be described.

Figure 15:
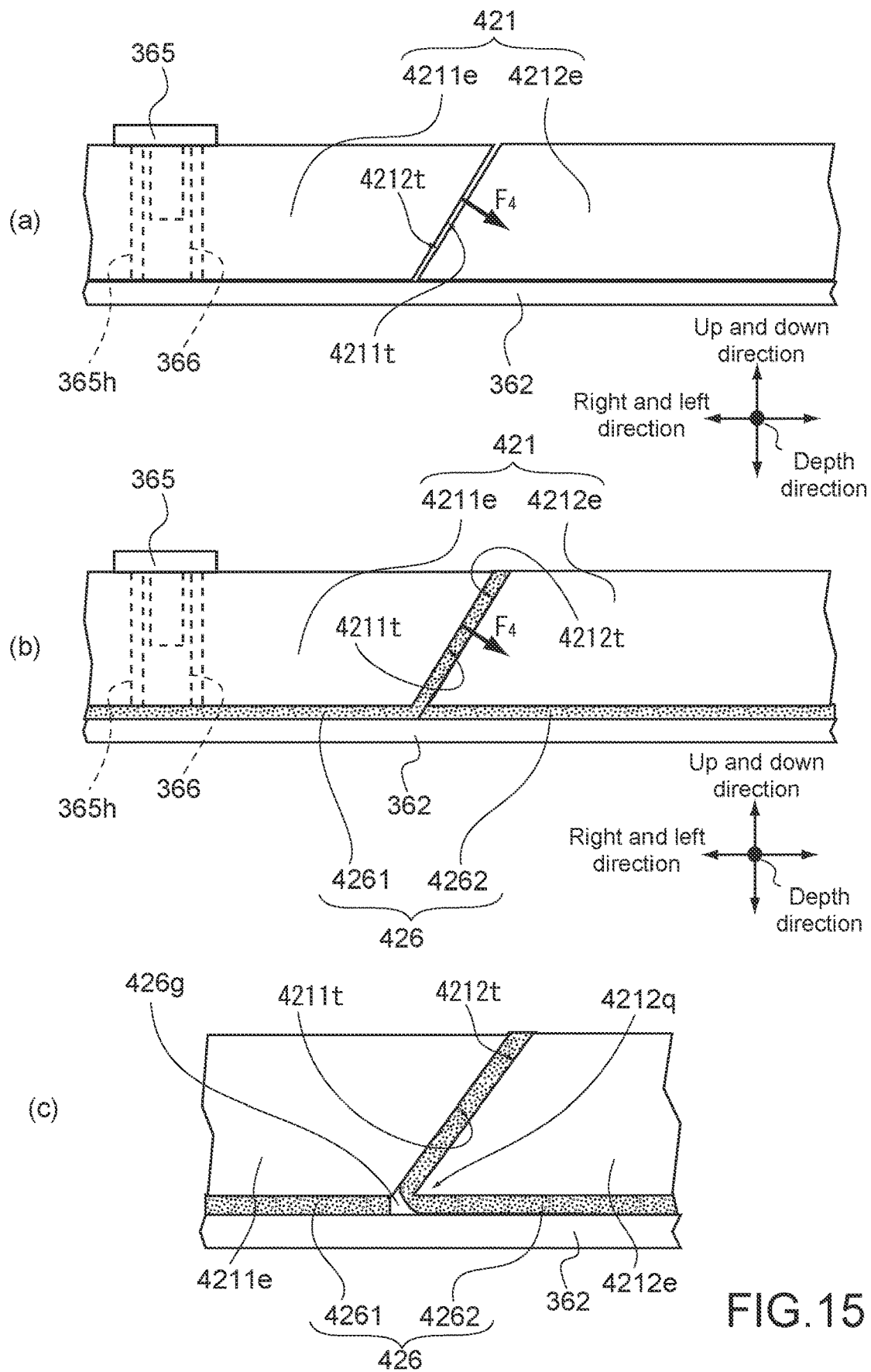
FIG. 15 Part (a) of the figure is a schematic side view of an area between the first extension portion of the first thermal insulation member and the second extension portion of the second thermal insulation member, which is shown in Part (a) of FIG. 12, as viewed from the outdoor space side in an indoor and outdoor direction. Part (b) of the figure is a schematic side view showing an example in which a wind-shielding material is disposed between a pressing surface and an action surface when the first thermal insulation portion is disposed in the outside casing.

Part (a) of FIG. 15 is a schematic side view of an area between the first extension portion of the first thermal insulation member and the second extension portion of the second thermal insulation member, which is shown in Part (a) of FIG. 12, as viewed from the outdoor space side in an indoor and outdoor direction (a schematic side view of an area between the first extension portion of the first thermal insulation member and the second extension portion of the second thermal insulation member as viewed from the direction shown as the arrow $P_0$). In Part (a) of FIG. 15, a state in which the first extension portion 4211e and the second extension portion 4212e are slightly spaced apart from each other in the right and left direction is shown. The first extension portion 4211e and the second extension portion 4212e may be in contact with each other. Here, the state in which the first extension portion 4211e and the second extension portion 4212e are slightly spaced apart from each other means that in the case where a cushioning member is provided between them, a clearance between the first end surface 4211t of the first extension portion 4211e and the second end surface 4212t of the second extension portion 4212e has a distance to serve as a compression margin for the cushioning member. In addition, the "compression margin" means a dimension that has been confirmed in previous tests, etc. to be capable of keeping the air-tightness between the first end surface 4211t and the second end surface 4212t as long as the cushioning member is compressed to the clearance dimension.

In the present embodiment, the first end surface 4211t of the first thermal insulation member 4211 includes a pressing surface that applies a pressure toward the second top wall 362 of the outside casing 34 to the second end surface 4212t of the second thermal insulation member 4212. In this case, the second end surface 4212t of the second thermal insulation member 4212 includes an action surface that receives the pressure. The action surface is formed in parallel with the pressing surface.

For example, in the example of Part (a) of FIG. 15, the first end surface 4211t of the first extension portion 4211e includes a pressing surface that applies a pressure $F_4$ to the second end surface 4212t of the second extension portion 4212e. For example, when the first thermal insulation portion 421 is disposed in the outside casing 34, the first end surface 4211t of the first extension portion 4211e is formed to have an acute angle with respect to the outside casing 34 (the second top wall 362 of the outside casing 34). The second end surface 4212t of the second extension portion 4212e is formed at an obtuse angle with respect to the outside casing 34 (the second top wall 362 of the outside casing 34). Moreover, the first extension portion 4211e in vicinity of the first end surface 4211t is provided with the fixation members 365 that fix the first thermal insulation member 4211 to the outside casing 34 (the second top wall 362 of the outside casing 34).

Since the fixation members 365 are provided in vicinity of the first end surface 4211t, the first extension portion 4211e in vicinity of the first end surface 4211t is pushed against the second top wall 362 by fixing the first extension portion 4211e to the second top wall 362 with the fixation members 365. By the first extension portion 4211e being pushed to the second top wall 362 side, the pressure $F_4$ of the first end surface 4211t pressing the second end surface 4212t acts. As a result, the first end surface 4211t of the first extension portion 4211e and the second end surface 4212t of the second extension portion 4212e are held in close contact with each other, wind-shielding properties between the first extension portion 4211e and the second extension portion 4212e are secured.

Moreover, since the pressure $F_4$ pushes the second extension portion 4212e against the second top wall 362, the end surface 422s of the second thermal insulation portion 422 receives the pressure $F_3$ from the end surface 4212s of the second extension portion 4212e also between the second extension portion 4212e and the second thermal insulation portion 422 shown in Part (c) of FIG. 14. As a result, the wind-shielding material 425 is compressed by the end surface 422s and the end surface 4212s, and the air-tightness between the end surface 422s and the end surface 4212s is maintained. As a result, wind-shielding properties between the second extension portion 4212e and the second thermal insulation portion 422 are secured.

By utilizing the pressure $F_4$ received by the second extension portion 4212e from the first extension portion 4211e in this manner, wind-shielding properties between the first extension portion 4211e and the second extension portion 4212e and wind-shielding properties between the second extension portion 4212e and the second thermal insulation portion 422 are secured.

It should be noted that in the present embodiment, the second end surface 4212t of the second thermal insulation member 4212 may include a pressing surface that applies a pressure toward the second top wall 362 of the outside casing 34 to the first end surface 4211t. In this case, an angle formed by the second end surface 4212t and the second top wall 362 is an acute angle and an angle formed by the first end surface 4211t and the second top wall 362 is an obtuse angle (not shown).

That is, in the present embodiment, either one of the first end surface 4211t of the first thermal insulation member 4211 and the second end surface 4212t of the second thermal insulation member 4212 includes a pressing surface that applies a pressure toward the second top wall 362 of the outside casing 34 to the other of the first end surface 4211t and the second end surface 4212t and the other of the first end surface 4211t and the second end surface 4212t includes an action surface that receives a pressure.

Moreover, a cushioning member may be arranged between either the first thermal insulation member 4211 or the second thermal insulation member 4212 and the outside casing 34 and a part of the cushioning member may function as a wind-shielding material.

Part (b) of FIG. 15 is a schematic side view showing an example in which a wind-shielding material is disposed between a pressing surface and an action surface when the first thermal insulation portion is disposed in the outside casing. For example, in Part (b) of FIG. 15, an example in which a cushioning member 426 as the second wind-shielding material is disposed between the first thermal insulation portion 421 and the outside casing 34 (the second top wall 362 of the outside casing 34) is shown. The cushioning member 426 includes, for example, a first cushioning member 4261 and a second cushioning member 4262. The first cushioning member 4261 is disposed between the first thermal insulation member 4211 and the second top wall 362. The second cushioning member 4262 is disposed between the second thermal insulation member 4212 and the second top wall 362. For example, in Part (b) of FIG. 15, an example in which the first cushioning member 4261 is disposed between the first extension portion 4211e and the second top wall 362 is shown and an example in which the second cushioning member 4262 is disposed between the second extension portion 4212e and the second top wall 362 is shown.

Moreover, a part of the first cushioning member 4261 is provided between the first end surface 4211t and the second end surface 4212t. The part of the first cushioning member 4261 provided between the first end surface 4211t and the second end surface 4212t functions as a wind-shielding material. As a result, this wind-shielding material is compressed by the first end surface 4211t and the second end surface 4212t, and the air-tightness between the first end surface 4211t and the second end surface 4212t is maintained.

Here, there can also be a method in which in the case where the second end surface 4212t is an action surface that receives the pressure $F_4$, a part of the second cushioning member 4262 is made to extend between the first end surface 4211t and the second end surface 4212t so that this part can function as a wind-shielding material between the first end surface 4211t and the second end surface 4212t as shown in the comparative example of Part (c) of FIG. 15.

However, in this method, the second cushioning member 4262 is folded back at an acute angle by a sharp-pointed portion 4212q of the second extension portion 4212e. As a result, the thickness of the second cushioning member 4262 is smaller in vicinity of the sharp-pointed portion 4212q, and there is a possibility that a clearance 426g is formed between the first cushioning member 4261 and the second cushioning member 4262. Thus, as shown in Part (b) of FIG. 15, a part of the first cushioning member 4261 is provided between the first end surface 4211t and the second end surface 4212t so that this part can function as a wind-shielding material. In this manner, a decrease in the thickness of the second cushioning member 4262 which would be caused by the second cushioning member 4262 being bent at the sharp-pointed portion 4212q does not occur, and wind-shielding properties between the first end surface 4211t and the second end surface 4212t are secured.

Figure 16:
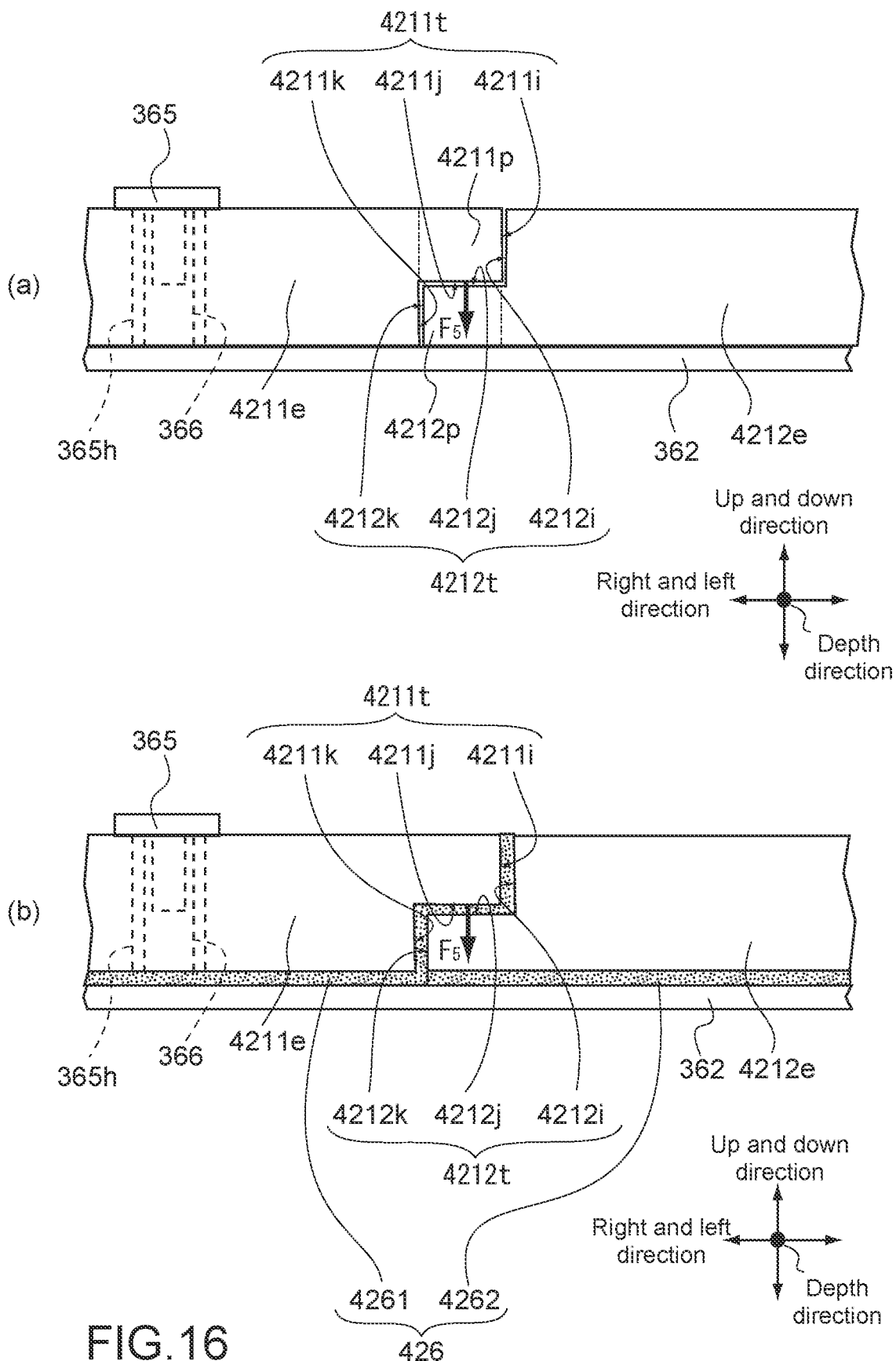
FIG. 16 A schematic side view showing a modified example of the pressing surface, the action surface, and the wind-shielding material.

Moreover, in the present embodiment, a part of the first end surface 4211t may be a pressing surface and a part of the second end surface 4212t may be an action surface. For example, Part (a) and Part (b) of FIG. 16 are schematic sides view showing a modified example of the pressing surface, the action surface, and the wind-shielding material. It should be noted that in Part (a) of FIG. 16, a state in which the first extension portion 4211e and the second extension portion 4212e are slightly spaced apart from each other in the right and left direction is shown. The first extension portion 4211e and the second extension portion 4212e may be in contact with each other.

A part of the first end surface 4211t becomes a pressing surface when the first thermal insulation member 4211 is disposed in the outside casing 34 and this pressing surface is formed to be in parallel with the outside casing 34. Moreover, a part of the second end surface 4212t becomes an action surface and this action surface is formed to be in parallel with the pressing surface formed in parallel with the outside casing 34.

For example, in the example of Part (a) of FIG. 16, the first extension portion 4211e has a projection 4211p where a part of the first extension portion 4211e projects to the second extension portion 4212e side. Moreover, the second extension portion 4212e has a projection 4212p where a part of the second extension portion 4212e projects to the first extension portion 4211e side. The projection 4211p is formed to cover the projection 4212p.

For example, the end surface 4211t of the first extension portion 4211e includes an end surface 4211i, an end surface 4211j continuous with the end surface 4211i, and an end surface 4211k continuous with the end surface 4211j. In the present embodiment, the end surface 4211i and the end surface 4211k are formed perpendicular to the second top wall 362. The end surface 4211j is formed in parallel with the second top wall 362. The second end surface 4212t of the second extension portion 4212e includes an end surface 4212i, an end surface 4212j continuous with the end surface 4212i, and an end surface 4212k continuous with the end surface 4212*j*. In the present embodiment, the end surface 4212*i* and the end surface 4212*k* are formed perpendicular to the second top wall 362. The end surface 4212*j* is formed in parallel with the second top wall 362. The end surface 4211*i* faces the end surface 4212*i*, the end surface 4211*j* faces the end surface 4212*j*, and the end surface 4211*k* faces the end surface 4212*k*.

By the fixation members 365 pushing the first extension portion 4211*e* to the second top wall 362 side, a pressure $F_5$ acts on the end surface 4212*j* from the end surface 4211*j*. That is, the end surface 4211*j* becomes a pressing surface that presses the end surface 4212*j* and the end surface 4212*j* becomes an action surface that receives the pressure $F_5$ from the end surface 4211*j*. Also with such a structure, the first end surface 4211*t* and the second end surface 4212*t* are held in close contact with each other between the first extension portion 4211*e* and the second extension portion 4212*e*.

Moreover, as shown in Part (b) of FIG. 16, a part of the first cushioning member 4261 may be provided between the first end surface 4211*t* and the second end surface 4212*t*. The part of the first cushioning member 4261 provided between the first end surface 4211*t* and the second end surface 4212*t* functions as a wind-shielding material. In this manner, this wind-shielding material is compressed by the first end surface 4211*t* and the second end surface 4212*t*, and the airtightness between the first end surface 4211*t* and the second end surface 4212*t* is further improved.

Figure 17:
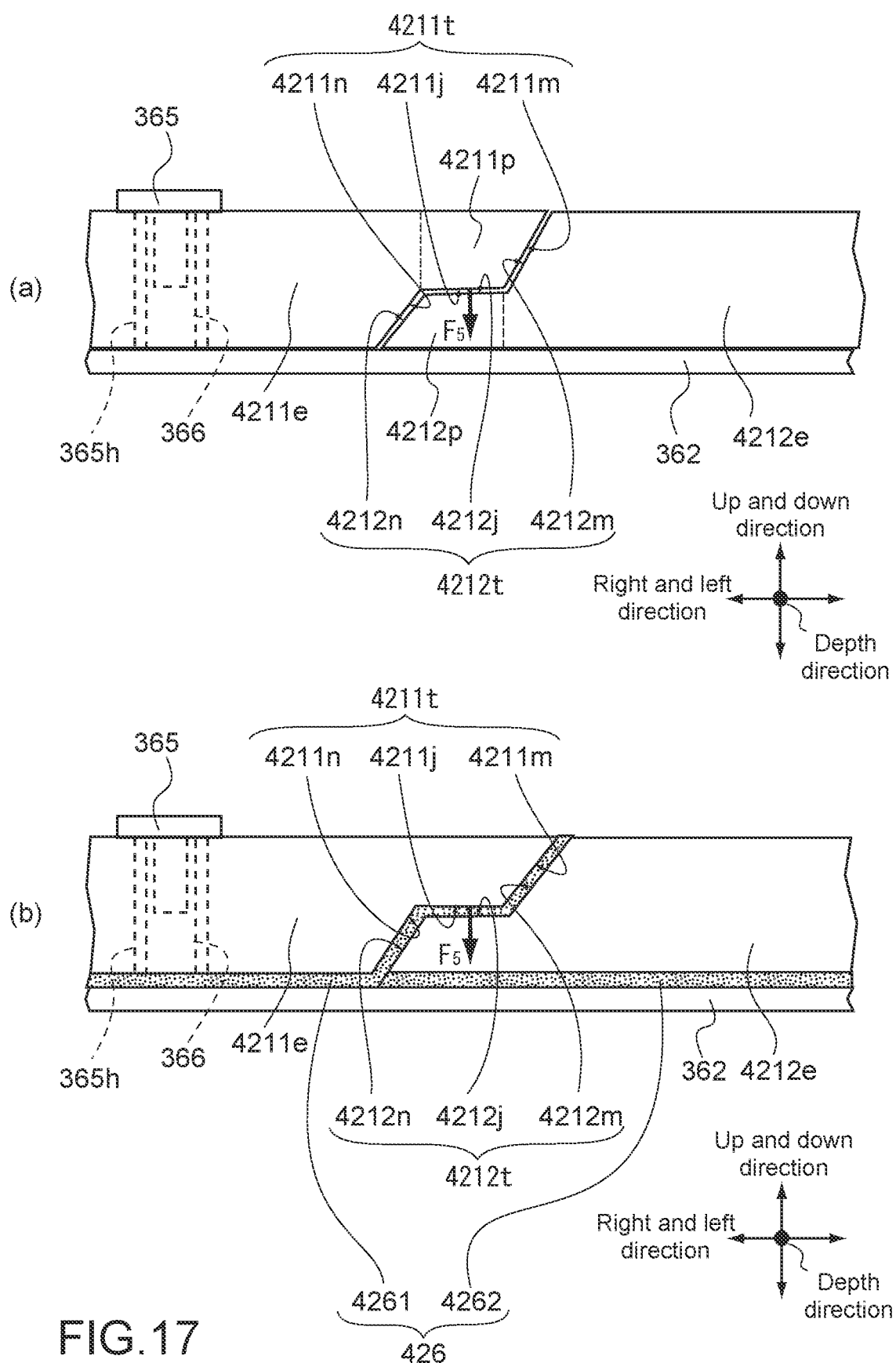
FIG. 17 A schematic side view showing another modified example of the pressing surface, the action surface, and the wind-shielding material.

Moreover, another example in which a part of the first end surface 4211*t* becomes a pressing surface and a part of the second end surface 4212*t* becomes an action surface will be described below. For example, Part (a) and Part (b) of FIG. 17 are schematic side views showing another modified example of the pressing surface, the action surface, and the wind-shielding material. It should be noted that in Part (a) of FIG. 17, a state in which the first extension portion 4211*e* and the second extension portion 4212*e* are slightly spaced apart from each other in the right and left direction is shown. The first extension portion 4211*e* and the second extension portion 4212*e* may be in contact with each other.

For example, in the example of Part (a) of FIG. 17, the first extension portion 4211*e* has a projection 4211*p*. Moreover, the second extension portion 4212*e* has a projection 4212*p*. The projection 4211*p* is formed to cover the projection 4212*p*.

The end surface 4211*t* of the first extension portion 4211*e* includes an end surface 4211*m*, an end surface 4211*j* continuous with the end surface 4211*m*, and an end surface 4211*n* continuous with the end surface 4211*j*. In the present embodiment, the end surface 4211*m* and the end surface 4211*n* are formed oblique to the second top wall 362. For example, an angle formed by the end surface 4211*m* and the second top wall 362 is formed as an acute angle and an angle formed by the end surface 4211*n* and the second top wall 362 is formed as an acute angle. The end surface 4211*j* is formed in parallel with the second top wall 362. The second end surface 4212*t* of the second extension portion 4212*e* includes an end surface 4212*m*, an end surface 4212*j* continuous with the end surface 4212*m*, and an end surface 4212*n* continuous with the end surface 4212*j*. In the present embodiment, the end surface 4212*m* and the end surface 4212*n* are formed oblique to the second top wall 362. For example, an angle formed by the end surface 4212*m* and the second top wall 362 is formed as an obtuse angle and an angle formed by the end surface 4212*n* and the second top wall 362 is formed as an obtuse angle. The end surface 4212*j* is formed in parallel with the second top wall 362. The end surface 4211*m* faces the end surface 4212*m*, the end surface 4211*j* faces the end surface 4212*j*, and the end surface 4211*n* faces the end surface 4212*n*.

By the fixation members 365 pushing the first extension portion 4211*e* to the second top wall 362 side, a pressure $F_5$ acts on the end surface 4212*j* from the end surface 4211*j*. That is, the end surface 4211*j* becomes a pressing surface that presses the end surface 4212*j* and the end surface 4212*j* becomes an action surface that receives the pressure $F_5$ from the end surface 4211*j*. Also with such a structure, the first end surface 4211*t* and the second end surface 4212*t* are held in close contact with each other between the first extension portion 4211*e* and the second extension portion 4212*e*.

Moreover, as shown in Part (b) of FIG. 17, a part of the first cushioning member 4261 may be provided between the first end surface 4211*t* and the second end surface 4212*t*. The part of the first cushioning member 4261 provided between the first end surface 4211*t* and the second end surface 4212*t* functions as a wind-shielding material. In this manner, this wind-shielding material is compressed by the first end surface 4211*t* and the second end surface 4212*t*, and the airtightness between the first end surface 4211*t* and the second end surface 4212*t* is further improved.

As described above, even if the building wall 29 becomes relatively thin and the length of the wall communication hole 31 in the indoor and outdoor direction becomes shorter, sufficient thermal insulation performance is secured without deteriorating the workability in installing the outdoor unit 13 of the air conditioner 11 in the outside casing 34.

Although the embodiment of the present invention has been described above, it goes without saying that the present invention is not limited to only the above-mentioned embodiment and various modifications can be made. The respective embodiments are not limited to the independent embodiments and can be combined with each other if technically possible.

REFERENCE SIGNS LIST 11 air conditioner
12 indoor unit
13 outdoor unit
131 upper surface
14 indoor heat exchanger
15*a* suction pipe
15 compressor
15*b* discharge pipe
16 outdoor heat exchanger
17 expansion valve
18 four-way valve
18*a* first port
18*b* second port
18*c* third port
18*d* fourth port
19 refrigeration circuit
21 circulation path
22*a* gas pipe
22 circulation path
22*b* liquid pipe
23, 24 blower fan
25, 26 control unit
29 building wall
31 wall communication hole
310*e* open end
310 region
32 building
33 open port 34 outside casing
35 storage port
36ce bent portion
36 wall body
36a first side wall
36b second side wall
36c bottom plate
360 top wall
360B boundary
361 first top wall
361a bent portion
361b extension portion
362 second top wall
362a bent portion
365 fixation member
365h through-hole
366 attachment member
367 supporting member
37 front panel
38 grille
39 inside space
40 thermal insulation material
41 first thermal insulation material
41t tilt surface
42 second thermal insulation material
42t tilt surface
421, 421B, 421C first thermal insulation portion
4211 first thermal insulation member
4211b first base portion
4211e first extension portion
4211t first end surface
4211s, 4211i, 4211j, 4211k, 4211m, 4211n end surface
4211p projection
4212 second thermal insulation member
4212b second base portion
4212e second extension portion
4212t second end surface
4212s, 4212i, 4212j, 4212k, 4212m, 4212n end surface
4212p projection
4212q sharp-pointed portion
422, 422B, 422C second thermal insulation portion
422s end surface
422h recess portion
424, 424B, 424C recess portion
425 wind-shielding material
426 cushioning member
4261 first cushioning member
4262 second cushioning member
426g clearance
45 metal foil
46 metal foil
50 space forming member
51 first space forming member
51e end portion
511, 512 plate portion
513 separation wall
52 second space forming member
52a first member
52b second member
52e end portion
521, 522 plate portion
523 separation wall
55 space
60 elastic body
410 partition member

The invention claimed is:

1. An air conditioner that includes an indoor unit having an indoor heat exchanger, an outdoor unit having an outdoor heat exchanger connected to the indoor heat exchanger through a refrigerant pipe, and an outside casing housing at least the outdoor unit and is attached to a building wall that partitions an outdoor space and an indoor space, wherein
the outside casing that is fitted in a wall communication hole and has an inside space in which the outdoor unit is capable of being disposed, the wall communication hole being formed in the building wall, and the wall communication hole communicating between the outdoor space and the indoor space,
the inside space is opened to the outdoor space,
the outdoor unit is disposed in the inside space of the outside casing,
a thermal insulation material is disposed in the inside space of the outside casing,
the thermal insulation material at least includes
a first thermal insulation portion that is disposed on a side of the outdoor space, and
a second thermal insulation portion that is disposed on a side of the indoor space and is attachable and detachable, and
the first thermal insulation portion has a recess portion in which the second thermal insulation portion fits.

2. The air conditioner according to claim 1, wherein
provided that a direction perpendicular to a direction toward the indoor space from the outdoor space and an up and down direction as a top wall is upper is a right and left direction, the top wall forming an upper surface of the outside casing,
the thermal insulation material extends in the right and left direction and has the right and left direction as its longitudinal direction, and
the thermal insulation material is disposed on a lower side of the top wall.

3. The air conditioner according to claim 2, wherein
the top wall has a first top wall that is disposed in the indoor space and a second top wall that is disposed from the wall communication hole to the outdoor space when the outside casing is fitted in the wall communication hole, and
the first thermal insulation portion and the second thermal insulation portion are disposed on a lower side of the second top wall.

4. The air conditioner according to claim 1, wherein
provided that a direction perpendicular to a direction toward the indoor space from the outdoor space and an up and down direction as a top wall is upper is a right and left direction, the top wall forming an upper surface of the outside casing,
the recess portion is formed so that a dimension of the recess portion on the side of the indoor space is larger than a dimension of the recess portion on the side of the outdoor space in the right and left direction.

5. The air conditioner according to claim 4, wherein
a first wind-shielding material is provided between the first thermal insulation portion and the second thermal insulation portion.

6. The air conditioner according to claim 1, wherein
a space forming member forming a space between the outside casing and the thermal insulation material is disposed between the outside casing and the thermal insulation material.

7. The air conditioner according to claim 1, wherein
the first thermal insulation portion is divided into at least a first thermal insulation member and a second thermal insulation member,
the first thermal insulation member has a first end surface that faces the second thermal insulation member,
the second thermal insulation member has a second end surface that faces the first thermal insulation member, and
the first end surface and the second end surface face each other.

8. The air conditioner according to claim 7, wherein
the first thermal insulation member has a first base portion and a first extension portion extending from the first base portion,
the second thermal insulation member has a second base portion and a second extension portion extending from the second base portion,
in an indoor and outdoor direction toward the indoor space from the outdoor space, a length of the first extension portion is shorter than the first base portion and a length of the second extension portion is shorter than the second base portion, and
the first end surface is provided in the first extension portion and the second end surface is provided in the second extension portion.

9. The air conditioner according to claim 7, wherein
either one of the first end surface and the second end surface includes a pressing surface that applies a pressure toward the outside casing to an other of the first end surface and the second end surface, and
the other includes an action surface that receives a press.

10. The air conditioner according to claim 9, wherein
the first thermal insulation member has a first base portion and a first extension portion extending from the first base portion,
the second thermal insulation member has a second base portion and a second extension portion extending from the second base portion,
a length of the first extension portion in a direction perpendicular to an indoor and outdoor direction toward the indoor space from the outdoor space is longer than a length of the second extension portion in the direction perpendicular to the indoor and outdoor direction,
the first end surface includes the pressing surface, and
the first extension portion in vicinity of the first end surface is provided with a fixing portion that fixes the first thermal insulation member to the outside casing.

11. The air conditioner according to claim 9, wherein
the pressing surface is formed to have an acute angle with respect to the outside casing when the first thermal insulation portion is disposed in the outside casing, and
the action surface is formed to have an acute angle with respect to the outside casing when the second thermal insulation portion is disposed in the outside casing.

12. The air conditioner according to claim 9, wherein
the pressing surface is formed to be in parallel with the outside casing when the first thermal insulation portion is disposed in the outside casing, and
the action surface is formed to be in parallel with the pressing surface formed in parallel with the outside casing when the second thermal insulation portion is disposed in the outside casing.

13. The air conditioner according to claim 9, wherein
a second wind-shielding material is disposed between the pressing surface and the action surface when the first thermal insulation portion is disposed in the outside casing.

14. The air conditioner according to claim 13, wherein
a cushioning member is disposed between the first thermal insulation portion and the outside casing,
the cushioning member includes
a first cushioning member disposed between the first thermal insulation member and the outside casing, and
a second cushioning member disposed between the second thermal insulation member and the outside casing,
a part of the first cushioning member or a part of the second cushioning member is provided between the pressing surface and the action surface, and
the part of the first cushioning member or the part of the second cushioning member provided between the pressing surface and the action surface becomes the second wind-shielding material.

15. The air conditioner according to claim 14, wherein
a part of the cushioning member disposed between either one of the first thermal insulation member and the second thermal insulation member, in which the pressing surface is formed, and the outside casing becomes the second wind-shielding material.

\* \* \* \* \*